(12) United States Patent
Ozeki et al.

(10) Patent No.: US 10,866,474 B2
(45) Date of Patent: Dec. 15, 2020

(54) DISPLAY DEVICE

(71) Applicant: Japan Display Inc., Minato-ku (JP)

(72) Inventors: Yoshitaka Ozeki, Tokyo (JP); Koji Ishizaki, Tokyo (JP); Takahiro Takeuchi, Tokyo (JP); Koshiro Moriguchi, Tokyo (JP)

(73) Assignee: Japan Display Inc., Minato-ku (JP)

( * ) Notice: Subject to any disclaimer, the term of this patent is extended or adjusted under 35 U.S.C. 154(b) by 175 days.

(21) Appl. No.: 16/145,666

(22) Filed: Sep. 28, 2018

(65) Prior Publication Data

US 2019/0101801 A1    Apr. 4, 2019

(30) Foreign Application Priority Data

Sep. 29, 2017 (JP) .................................. 2017-191527
Oct. 10, 2017 (JP) .................................. 2017-197106

(51) Int. Cl.

| G02F 1/167 | (2019.01) |
|---|---|
| G02F 1/1362 | (2006.01) |
| G02F 1/1368 | (2006.01) |
| G02F 1/1335 | (2006.01) |
| G02F 1/1343 | (2006.01) |
| G02F 1/1333 | (2006.01) |
| G02F 1/16766 | (2019.01) |

(52) U.S. Cl.
CPC ...... *G02F 1/136227* (2013.01); *G02F 1/1368* (2013.01); *G02F 1/13439* (2013.01); *G02F 1/133345* (2013.01); *G02F 1/133553* (2013.01); *G02F 1/136286* (2013.01); *G02F 1/167* (2013.01); *G02F 1/16766* (2019.01); *G02F 2201/121* (2013.01); *G02F 2201/34* (2013.01)

(58) Field of Classification Search
CPC ............. G02F 1/167; G02F 2001/1678; G02F 1/1676; G02F 1/1681; G09G 3/344
USPC .......................................................... 359/296
See application file for complete search history.

(56) References Cited

U.S. PATENT DOCUMENTS

| 9,244,316 B2 * | 1/2016 | Nishino .............. G02F 1/13452 |
| 2016/0223870 A1 * | 8/2016 | Miki ................. G02F 1/133524 |

FOREIGN PATENT DOCUMENTS

JP    2011-221097    11/2011

* cited by examiner

*Primary Examiner* — Mohammed A Hasan
(74) *Attorney, Agent, or Firm* — Oblon, McClelland, Maier & Neustadt, L.L.P.

(57) ABSTRACT

According to one embodiment, a display device includes a switching element, an organic insulating film which covers the switching element, a reflective film in contact with the organic insulating film, a first transparent conductive film which covers the reflective film, a first capacitance insulating film which covers the first transparent conductive film, a pixel electrode disposed on the first capacitance insulating film and electrically connected to the switching element, an electrophoretic element disposed on the pixel electrode and a common electrode disposed on the electrophoretic element.

15 Claims, 20 Drawing Sheets

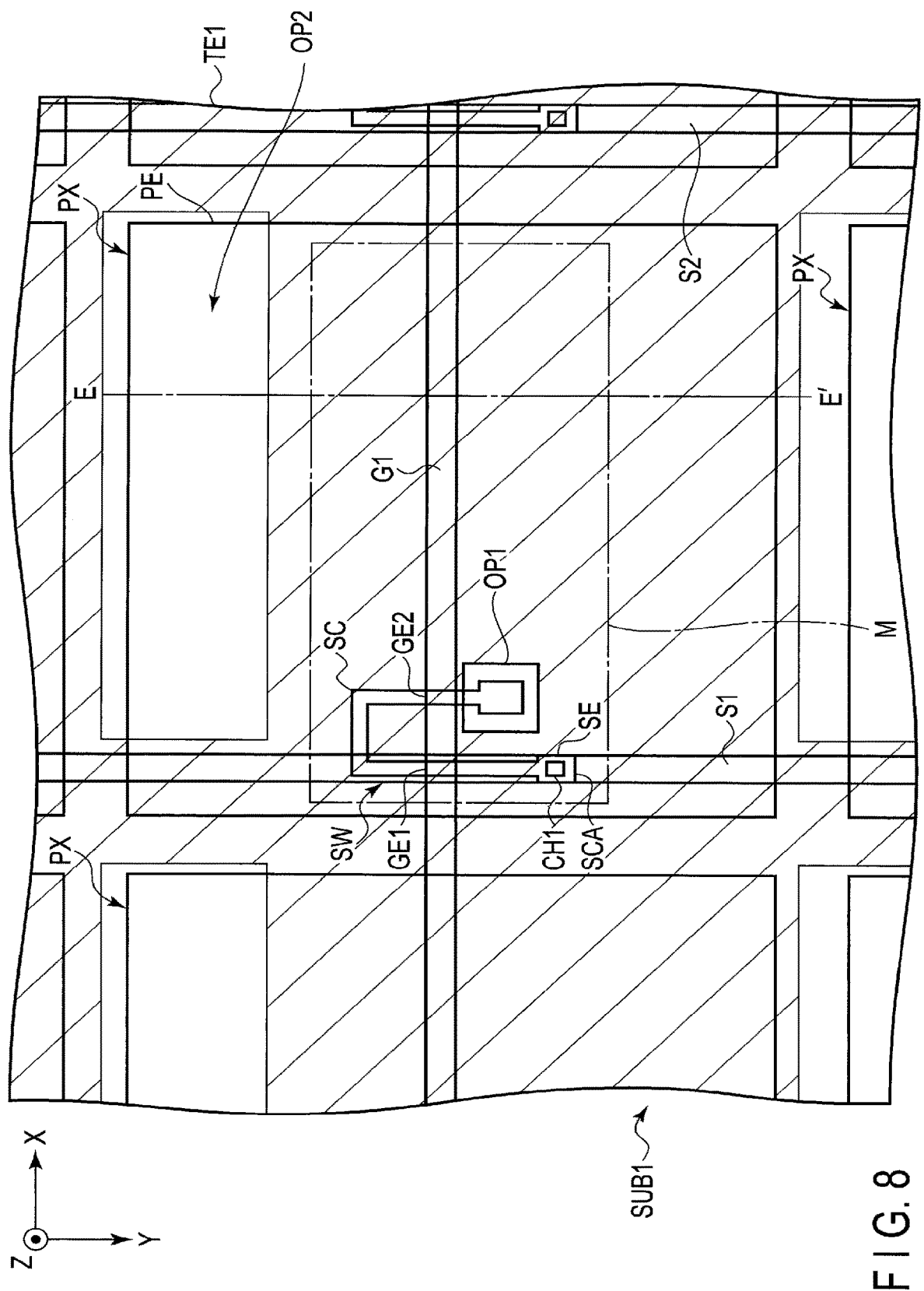
F I G. 8

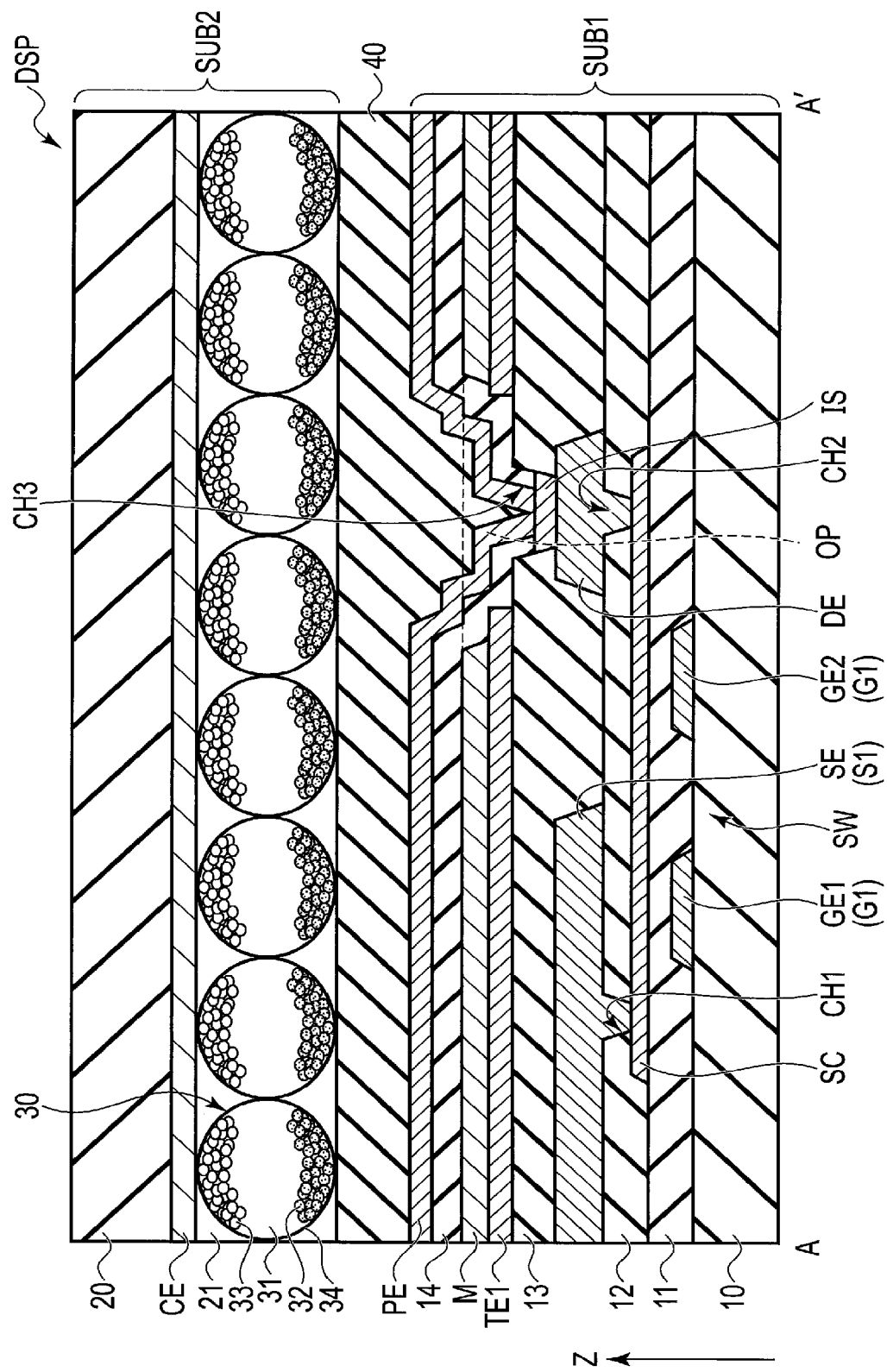
F I G. 16

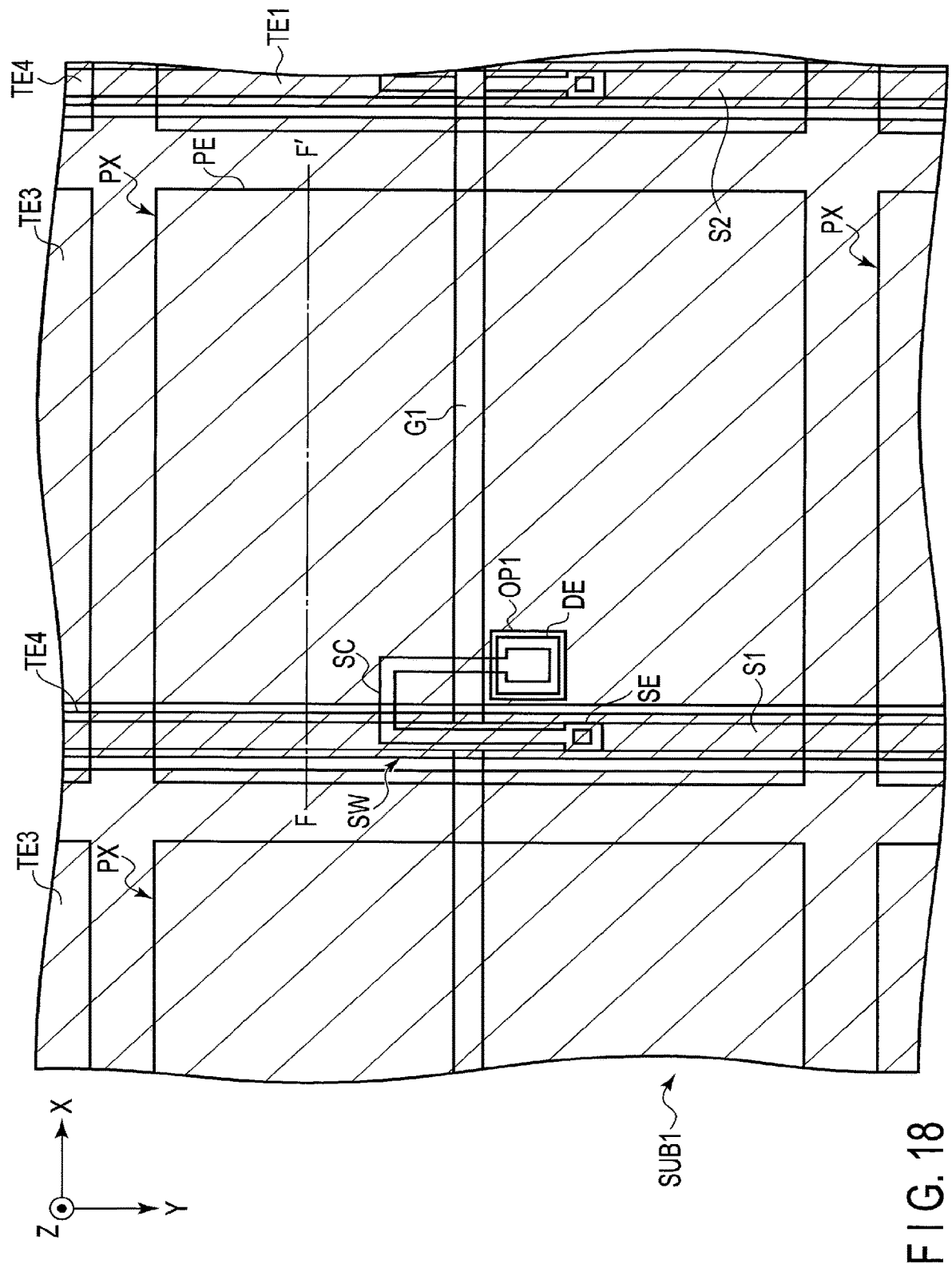
F I G. 18

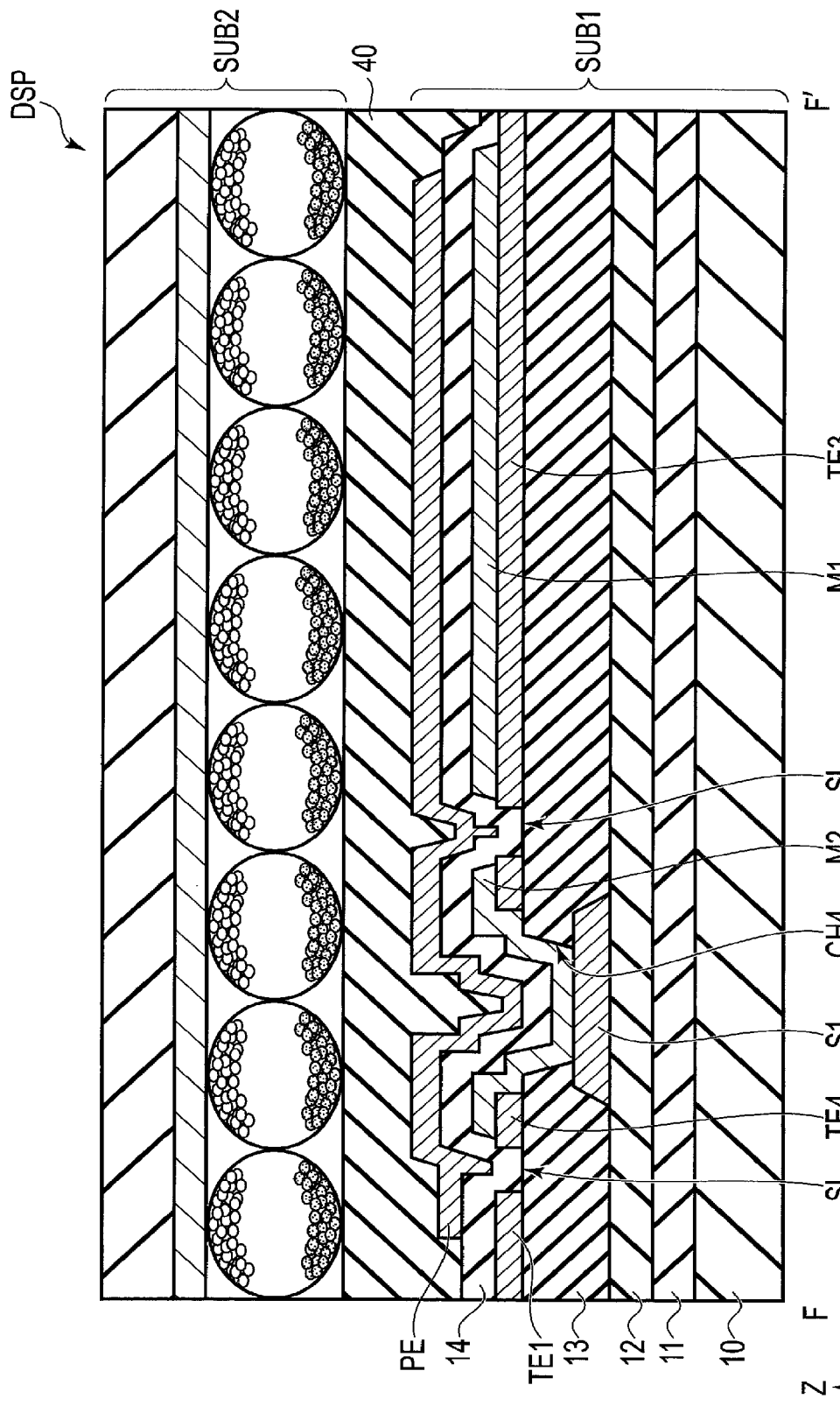
F I G. 19

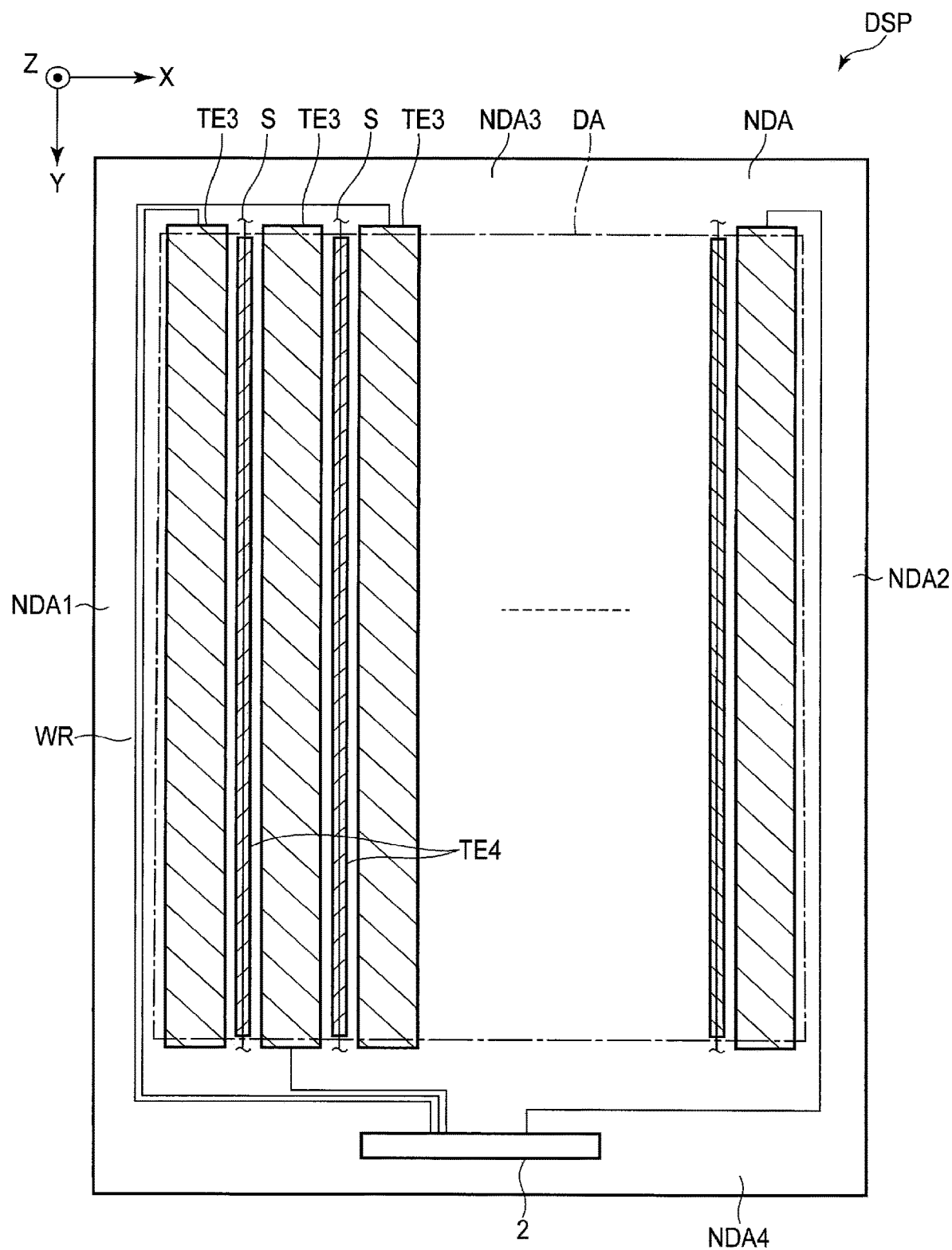
F I G. 20

DISPLAY DEVICE

CROSS-REFERENCE TO RELATED APPLICATIONS

This application is based upon and claims the benefit of priority from Japanese Patent Applications No. 2017-191527, filed Sep. 29, 2017; and No. 2017-197106, filed Oct. 10, 2017, the entire contents of all of which are incorporated herein by reference.

FIELD

Embodiments described herein relate generally to a display device.

BACKGROUND

For example, an electrophoretic display device having a structure in which an electrophoretic element in which microcapsules are arranged is held between an element substrate and a counter-substrate, has been disclosed. Electrophoretic display devices of this type have memorability and therefore they do not need to apply voltage to maintain a display state at all times. On the other hand, the electrophoretic display devices need to have a pixel capacitance in order to hold voltage for a certain period in each pixel. Such a pixel capacitance is constituted by, for example, a pixel capacitance electrode formed form a light-shielding metal film, a protective film and a pixel electrode.

BRIEF DESCRIPTION OF THE DRAWINGS

FIG. 8 is a plan view showing a modified example of the pixel of the display device shown in FIG. 1.

FIG. 16 is a cross-sectional view of a modified example of the pixel taken along line A-A' in FIG. 2.

FIG. 18 is a plan view showing a position of a transparent conductive film in the pixel shown in FIG. 17.

FIG. 19 is a cross-sectional view of the pixel taken along line F-F' which intersects a source line in FIG. 18.

FIG. 20 is a plan view showing positions of a third transparent conductive film and a fourth transparent conductive film shown in FIG. 19, with relative to each other.

DETAILED DESCRIPTION

Figure 1:
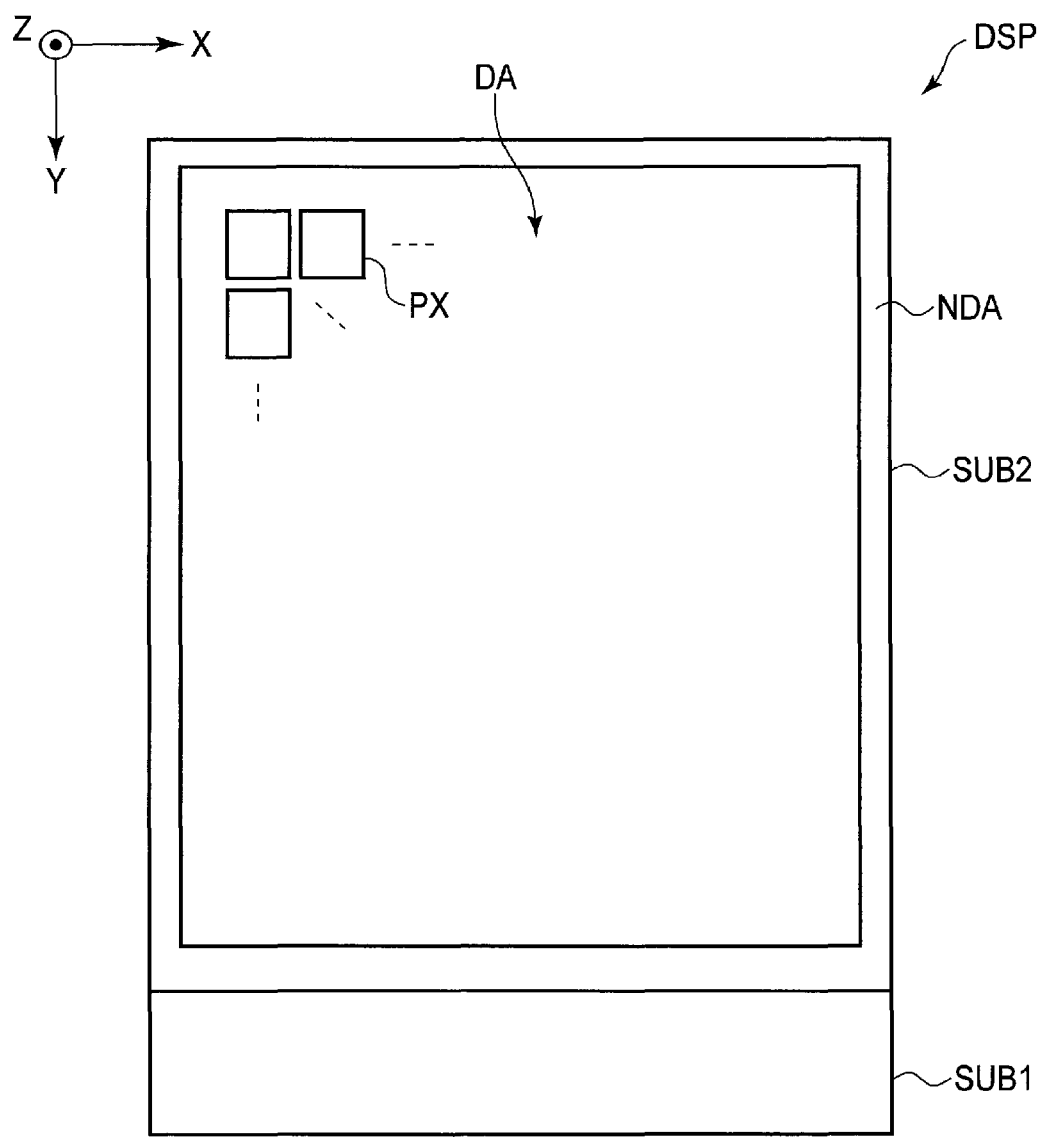
FIG. 1 is a plan view showing a configuration example of a display device of one of the embodiments.

In general, according to one embodiment, a display device comprises a switching element, an organic insulating film which covers the switching element, a reflective film in contact with the organic insulating film, a first transparent conductive film which covers the reflective film, a first capacitance insulating film which covers the first transparent conductive film, a pixel electrode disposed on the first capacitance insulating film and electrically connected to the switching element, an electrophoretic element disposed on the pixel electrode and a common electrode disposed on the electrophoretic element.

According to another embodiment, a display device comprises a switching element, an organic insulating film which covers the switching element, a first transparent conductive film in contact with the organic insulating film, a reflective film disposed on the first transparent conductive film, a first capacitance insulating film which covers the reflective film and the first transparent conductive film, a pixel electrode disposed on the first capacitance insulating film and electrically connected to the switching element, an electrophoretic element disposed on the pixel electrode and a common electrode disposed on the electrophoretic element.

Embodiments will be described hereinafter with reference to the accompanying drawings. The disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc., of the respective parts are schematically illustrated in the drawings, compared to the actual modes. However, the schematic illustration is merely an example, and adds no restrictions to the interpretation of the invention. In addition, in the specification and drawings, the structural elements, which have functions identical or similar to the functions described in connection with preceding drawings, are denoted by like reference numbers, and an overlapping detailed description thereof is omitted unless otherwise necessary.

The first embodiment will now be described.

FIG. 1 is a plan view showing a configuration example of a display device DSP of the embodiment.

In the figure, a first direction X and a second direction Y are directions intersecting each other, and a third direction Z is a direction intersecting the first direction X and the second direction Y. For example, the first direction X, the second direction Y and the third direction Z are orthogonal to each other, but they may cross each other at an angle other than 90 degrees. In this specification, a direction indicated by the tip of the arrow along the third direction Z is referred to as upward (or simply, up), and a direction opposite to that indicated by the tip of the arrow is referred to as downward (or simply, down). Further, when it is assumed that an observation position at which the display device DSP is to be observed is located at the pointing end side of the arrow indicating the third direction Z, a view toward an X-Y plane defined by the first direction X and the second direction Y is referred to as a plan view.

The display device DSP comprises a first substrate SUB1 and a second substrate SUB2. The display device DSP comprises a display area DA which displays images and a non-display area NDA surrounding the display area DA. The non-display area NDA is formed in a frame shape. The display area DA is located in a region where the first substrate SUB1 and the second substrate SUB2 overlap each other in plan view. The display area DA includes a plurality of pixels PX arrayed in a matrix.

Figure 2:
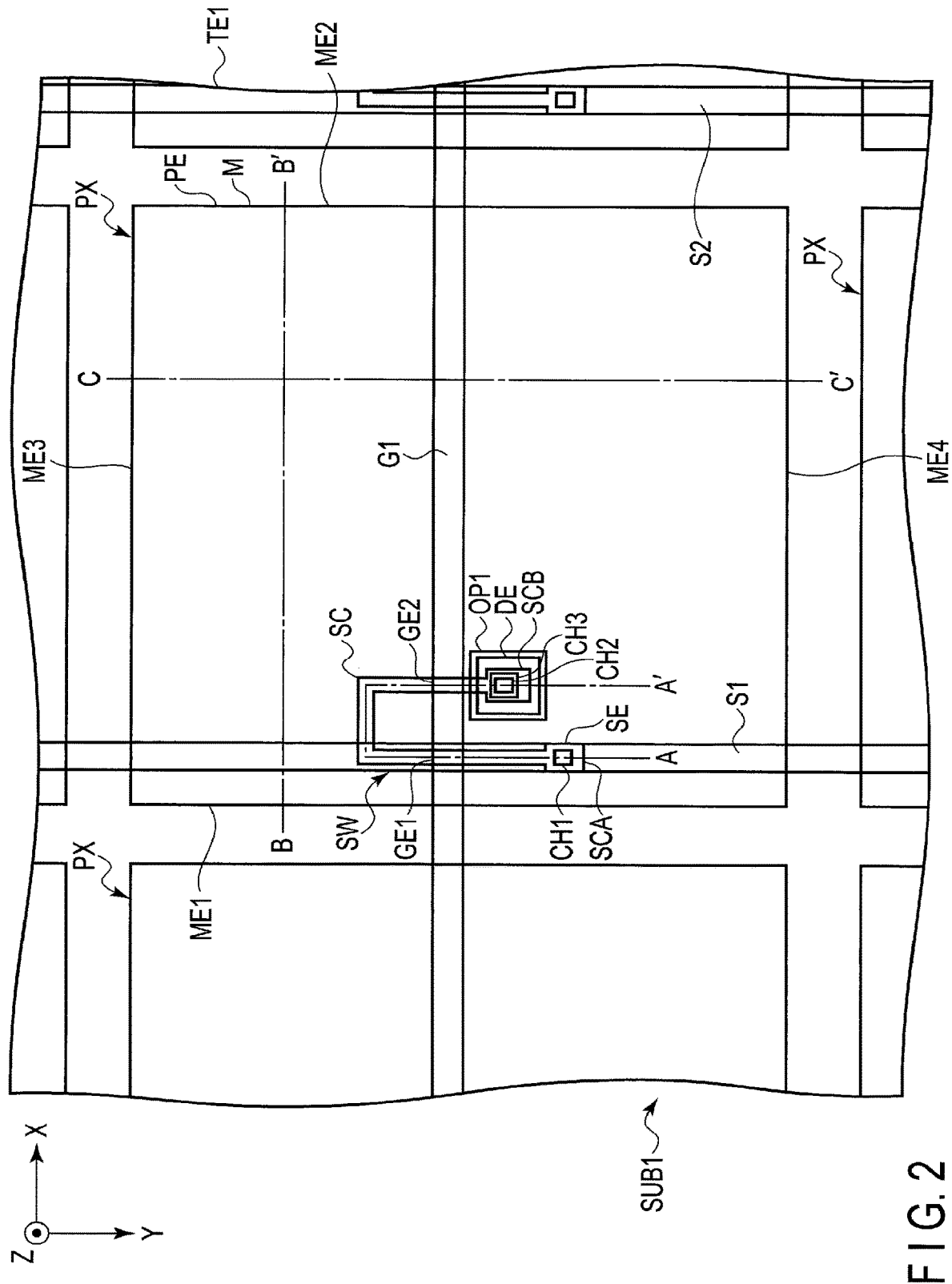
FIG. 2 is a plan view showing a pixel of the display device shown in FIG. 1.

FIG. 2 is a plan view of a pixel PX of the display device DSP shown in FIG. 1.

Of the pixel PX, here, only main elements of the first substrate SUB1 shown in FIG. 1 are illustrated. The pixel PX comprises a switching element SW, a reflective film M, a pixel electrode PE and a first transparent conductive film TE1.

The switching element SW comprises gate electrodes GE1 and GE2, a semiconductor layer SC, a source electrode SE and a drain electrode DE. The switching element SW illustrated has a double gate structure, but it may have a single gate structure. Moreover, the switching element SW may be of a top-gate structure in which the gate electrodes GE1 and GE2 are disposed above the semiconductor layer SC, or may be of a bottom-gate structure in which the gate electrodes GE1 and GE2 are disposed under the semiconductor layer SC.

The semiconductor layer SC is electrically connected, by one end portion SCA thereof, to a source line S1 via a contact hole CH1, and also electrically connected, by the other end portion SCB, to the drain electrode DE via a contact hole CH2. The semiconductor layer SC crosses a scanning line G1 between the one end portion SCA and the other end portion SCB.

The gate electrodes GE1 and GE2 correspond to regions of the scanning line G1, which overlap the semiconductor layer SC. In the example illustrated, the gate line G1 extends along the first direction X, and crosses a central portion of the pixel PX. The source electrode SE includes a region of the source line S1, which is in contact with the semiconductor layer SC. In the example illustrated, the source line S1 extends along the second direction Y and is located in a left-hand side end portion of the pixel PX. The drain electrode DE is formed into an island-like shape and is located between the source lines S1 and S2.

The reflective film M overlaps the pixel electrode PE, the first transparent conductive film TE1, the switching element SW, the gate line G1 and the source line S1 in the pixel PX. The reflective film M is formed into an island-like shape in each pixel PX. Further, the reflective film M comprises side surfaces ME1 and ME2 extending in the second direction Y, and side surfaces ME3 and ME4 extending in the first direction X. In the example illustrated, the reflective film M has a square shape in which a length of the side surfaces ME1 and ME2 along the second direction Y is equal to a length of the side surfaces ME3 and ME4 along the first direction X. Note that the reflective film M may be a rectangular shape elongated in the first direction X or the second direction Y, and may be some other polygon. As will be described, in the first embodiment, the side surfaces ME1 to ME4 are covered by the first transparent conductive film TE1.

The first transparent conductive film TE1 overlaps a plurality of pixel PXs arranged along the first direction X and the second direction Y, and also overlaps both the gate line G1 and the source line S1. The first transparent conductive film TE1 is formed over an entire region of the display area DA shown in FIG. 1. To the first transparent conductive film TE1, a common potential is supplied, for example, in the non-displaying area NDA. The first transparent conductive film TE1 and the reflective film M each comprise a first opening OP1 in a position overlapping the drain electrode DE in each pixel PX. The first opening OP1 is connected to the switching element SW.

The pixel electrode PE overlaps the first transparent conductive film TE1, the reflective film M, the switching element SW, the gate line G1 and the source line S1 in the pixel PX. The pixel electrode PE is electrically connected to the drain electrode DE via the contact hole CH3 and the first opening OP1. In the example illustrated, the pixel electrode PE is formed into a square shape with edges of the same length along the first direction X and the second direction Y, but the shape is not limited to this. The pixel electrode PE may have a rectangular shape elongated in the first direction X or the second direction Y, or may be of some other polygon. Further, in the example illustrated, the pixel electrode PE, and the reflective film M are substantially identical to each other in area and shape, but the area of the pixel electrode PE may be different from that of the reflective film M.

The portion where the pixel electrode PE and the first transparent conductive film TE1 overlap in plan view is equivalent to a pixel capacitance of each pixel PX. In the example illustrated, the first transparent conductive film TE1 is formed all over the entire surface of the pixel PX, and with this structure, substantially the entire region where the pixel electrode PE is formed, overlaps the first transparent conductive film TE1, to form the pixel capacitance.

Figure 3:
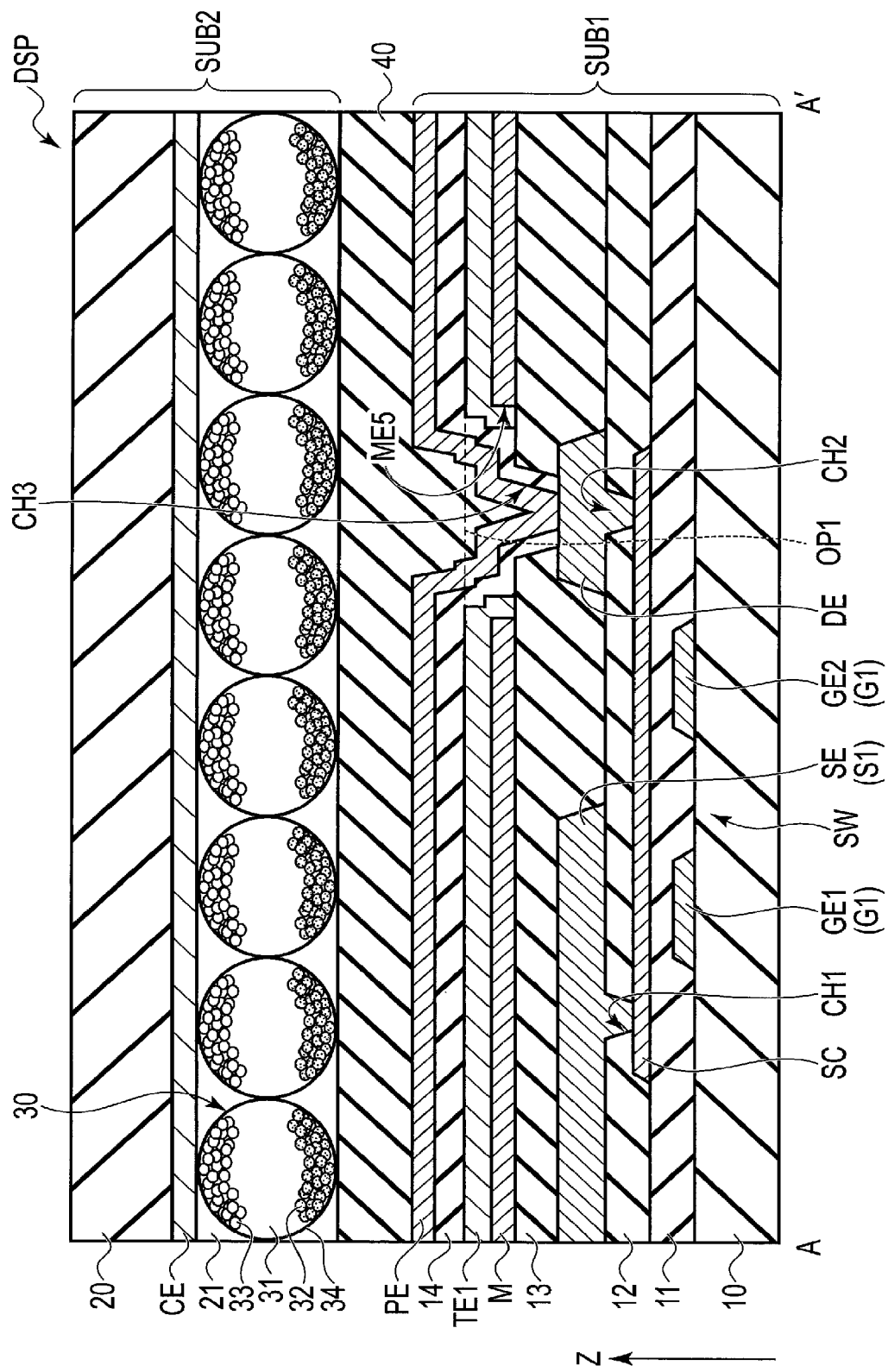
FIG. 3 is a cross-sectional view of the pixel taken along line A-A' in FIG. 2.

FIG. 3 is a cross-sectional view of the pixel PX taken along line A-A' shown in FIG. 2.

The first substrate SUB1 and the second substrate SUB2 are bonded to each other by an adhesive layer 40. As to the illustrated cross section, the position from which the display device DSP is observed is above the second substrate SUB2. The first substrate SUB1 comprises a base material 10, insulating films 11 to 13, a switching element SW, a reflective film M, a first transparent conductive film TE1, a first capacitance insulating film 14 and a pixel electrode PE.

The base material 10 is formed from an insulating glass, resin or the like. Since the base material 10 is located on an opposite side to the observation position, it may be opaque. The gate electrodes GE1 and GE2 integrated with the gate line G1 are located on the base material 10, and are covered by the insulating film 11. The scanning line G1 and the gate electrodes GE1 and GE2 are formed of a metal material such as aluminum (Al), titanium (Ti), silver (Ag), molybdenum (Mo), tungsten (W), copper (Cu) and chromium (Cr), or an alloy obtained by combining these metal materials, and they may have a single or multilayer structure.

The semiconductor layer SC is located on the insulating film 11, and is covered by the insulating film 12. The semiconductor layer SC is formed of, for example, polycrystalline silicon, but may be formed of amorphous silicon or an oxide semiconductor. The source electrode SE and the drain electrode DE integrated with the signal line S1 are located on the insulating film 12, and are covered by the insulating film 13. That is, the switching element SW is covered by the insulating film 13. The source line S1, the source electrode SE and the drain electrode DE are formed from an identical material, for example, one of the above-listed metal materials. The source electrode SE is in contact with the semiconductor layer SC via the contact hole CH1 which penetrates the insulating film 12. The drain electrode DE is in contact with the semiconductor layer SC via the contact hole CH2 which penetrates the insulating film 12.

The reflective film M is located on the insulating film 13 to be in contact therewith. The reflective film M functions as, for example, a reflective film which reflects the incidence light from a second substrate SUB2 side, and also as a light-shielding layer which shields light directed towards the switching element SW from the second substrate SUB2 side. The reflective film M is formed from, for example, a metal material such as aluminum. As a specific example, the reflective film M is formed from a multilayer of aluminum and titanium, a multilayer of aluminum and molybdenum, or the like. To the reflective film M, as it is in contact with the first transparent conductive film TE1, for example, a common potential is supplied.

The first transparent conductive film TE1 covers the reflective film M. The first transparent conductive film TE1 functions as a capacitance electrode for storing the pixel capacitance. The transparent conductive film TE1 is formed of a transparent conductive material such as indium tin oxide (ITO) or indium zinc oxide (IZO). The first transparent conductive film TE1 is covered by the first capacitance insulating film 14. Moreover, the first transparent conductive film TE1 covers a side surface ME5 of the reflective film M in the first opening OP1. As illustrated, the first transparent conductive film TE1 is in contact with the reflective film M, and therefore the first transparent conductive film TE1 and the reflective film M are electrically connected to each other.

The pixel electrode PE is located on the first capacitance insulating film 14. The pixel electrode PE is formed from, for example, a transparent conductive material such as ITO or IZO. The pixel electrode PE opposes the first transparent conductive film TE1 via the first capacitance insulating film 14. The pixel electrode PE is connected to the switching element SW in a position overlapping the first opening OP1 via the contact hole CH3 which penetrates the insulating film 13 and the first capacitance insulating film 14. In the formation of the contact hole CH3, the insulating film 13 and the first capacitance insulating film 14 may be etched collectively, or the insulating film 13 may be etched and then the first capacitance insulating film 14 may be etched. When the insulating film 13 and the first capacitance insulating film 14 are etched collectively, as illustrated, the first capacitance insulating film 14 does not cover end portions of the insulating film 13, and the end portions of the first capacitance insulating film 14 and the insulating film 13 form cross sections aligned substantially with each other.

In this embodiment, the insulating films 11 and 12 and the first capacitance insulating film 14 are each formed from an inorganic insulating material such as silicon oxide (SiO), silicon nitride (SiN) or silicon oxynitride (SiON). The insulating films 11 and 12 and the first capacitance insulating film 14 each may be of a single or multilayer structure. The first capacitance insulating film 14 is equivalent to a capacitor insulating film interposed between the first transparent conductive film TE1 and the pixel electrode PE. For example, the first transparent conductive film TE1 14 is formed of silicon nitride. The insulating film 13 is formed from an organic insulating material.

The second substrate SUB2 comprises a base material 20, a common electrode CE and an electrophoretic element 21. The base material 20 is formed from an insulating glass, resin or the like. The base material 20 is located on an observation position side, and therefore it is transparent. The common electrode CE is located on the electrophoretic element 21. The common electrode CE is a transparent electrode formed from a transparent conductive material such as ITO or IZO. The common electrode CE is formed throughout the entire region of the display area DA shown in FIG. 1. To the common electrode CE, a common potential is supplied in, for example, the non-display area NDA. The electrophoretic element 21 is formed on the pixel electrode PE. The electrophoretic element 21 comprises a plurality of microcapsules 30 arranged without any substantial gap. The adhesive layer 40 is located between the pixel electrode PE and the electrophoretic element 21.

The microcapsules 30 are each a spherical body having a particle diameter of, for example, about 50 to 100 μm. In the example illustrated, a number of microcapsules 30 are shown to be arranged between one pixel electrode PE and the common electrode CE due to scaling, but in a square-shaped pixel PX with edges having a length of about several hundreds of μm, one to about ten microcapsules 30 are disposed.

The microcapsules 30 each comprise a dispersion medium 31, a plurality of black particles 32 and a plurality of white particles 33. The black particles 32 and the white particles 33 may be referred to as electrophoretic particles. An outer shell portion (wall film) 34 of the microcapsule 30 is formed from, for example, a transparent resin such as an acrylic resin. The dispersion medium 31 is a liquid which disperse the black particles 32 and the white particles 33 in the respective microcapsule 30. The black particles 32 are (macromolecular or colloidal) particles consisting of, for example, black pigments such as aniline black and, for example, positively charged. The white particles 33 are (macromolecular or colloidal) particles consisting of, for example, white pigments such as titanium dioxide and are, for example, negatively charged. To these pigments, various additives may be added if needed. Moreover, in place of the black particles 32 and the white particles 33, for example, pigments of red, green, blue, yellow, cyan or magenta may be used.

In the electrophoretic element 21 of the above-described structure, to display black on a pixel PX, the pixel electrode PE is held at relatively a higher potential than that of the common electrode CE. That is, when the potential of the common electrode CE is referred to as a reference potential, the pixel electrode PE is held at positive polarity. Thus, the black particles 32 positively charged are attracted towards the common electrode CE, whereas the white particles 33 negatively charged are attracted towards the pixel electrode PE. As a result, when the pixel PX is observed from the common electrode CE side, it is viewed as black. On the other hand, to display white on the pixel PX, the potential of the common electrode CE is referred to as the referential potential, the pixel electrode PE is held at negative polarity. Thus, the white particles 33 negatively charged are attracted towards the common electrode CE side, whereas the black particles 32 positively charged are attracted towards the pixel electrode PE. As a result, when this pixel PX is viewed, it is observed as white.

Figure 4:
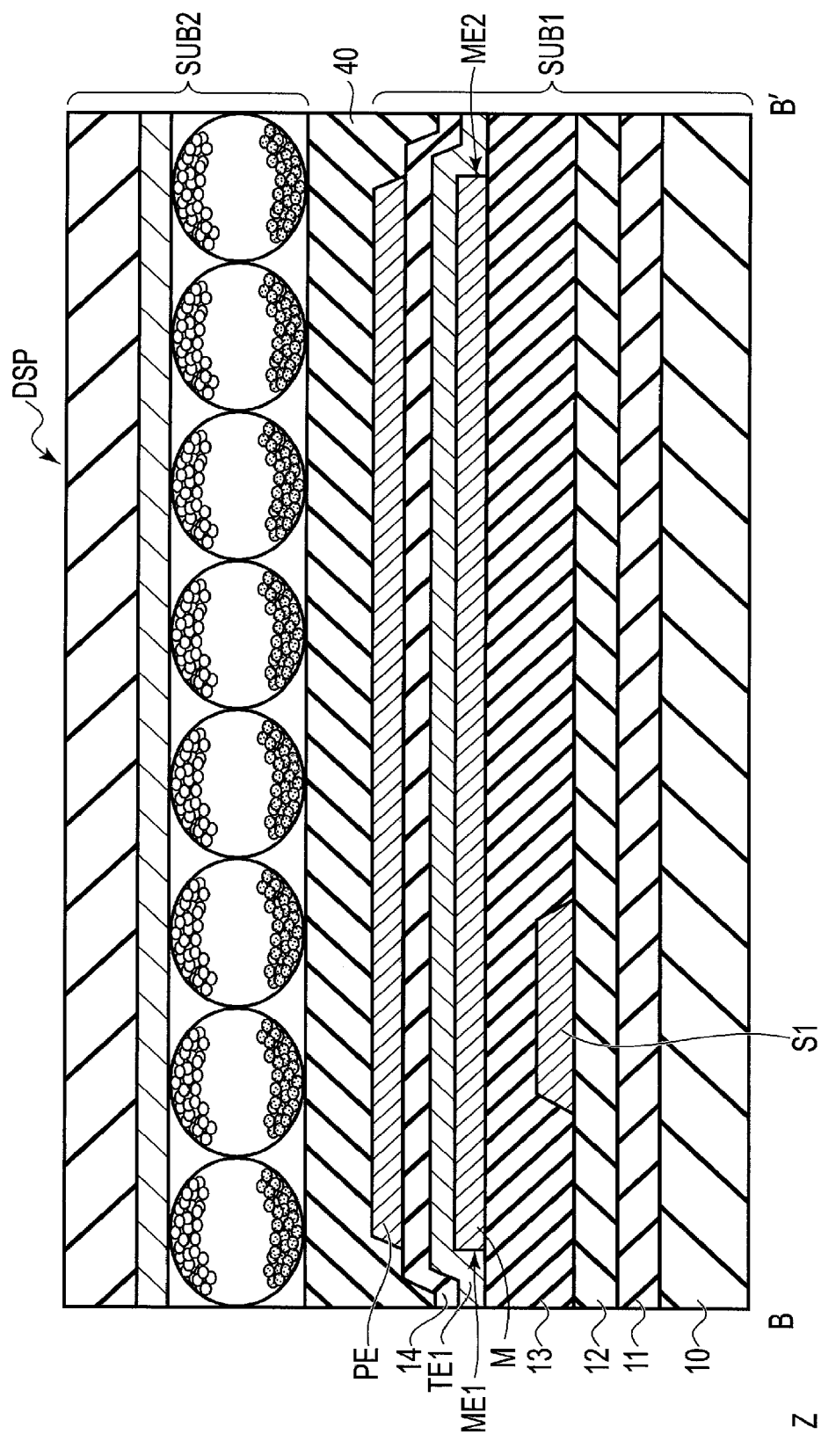
FIG. 4 is a cross-sectional view of the pixel taken along line B-B' which intersects a source line in FIG. 2.

FIG. 4 is a cross-sectional view of the pixel PX taken along line B-B' which intersects the source line 1 in FIG. 2.

The side surfaces ME1 and ME2 of the reflective film M are covered by the first transparent conductive film TE1. The reflective film M is disposed in a position overlapping the pixel electrode PE along the third direction Z. In the example illustrated, a width of the reflective film M along the first direction X, and a width of the pixel electrode PE along the first direction X are equal to each other, but the width of the reflective film M along the first direction X may be set in consideration of the reflection factor and the like, regardless of the width of the pixel electrode PE along the first direction X. Therefore, the width of the reflective film M may be greater or less than that of the pixel electrode PE.

Figure 5:
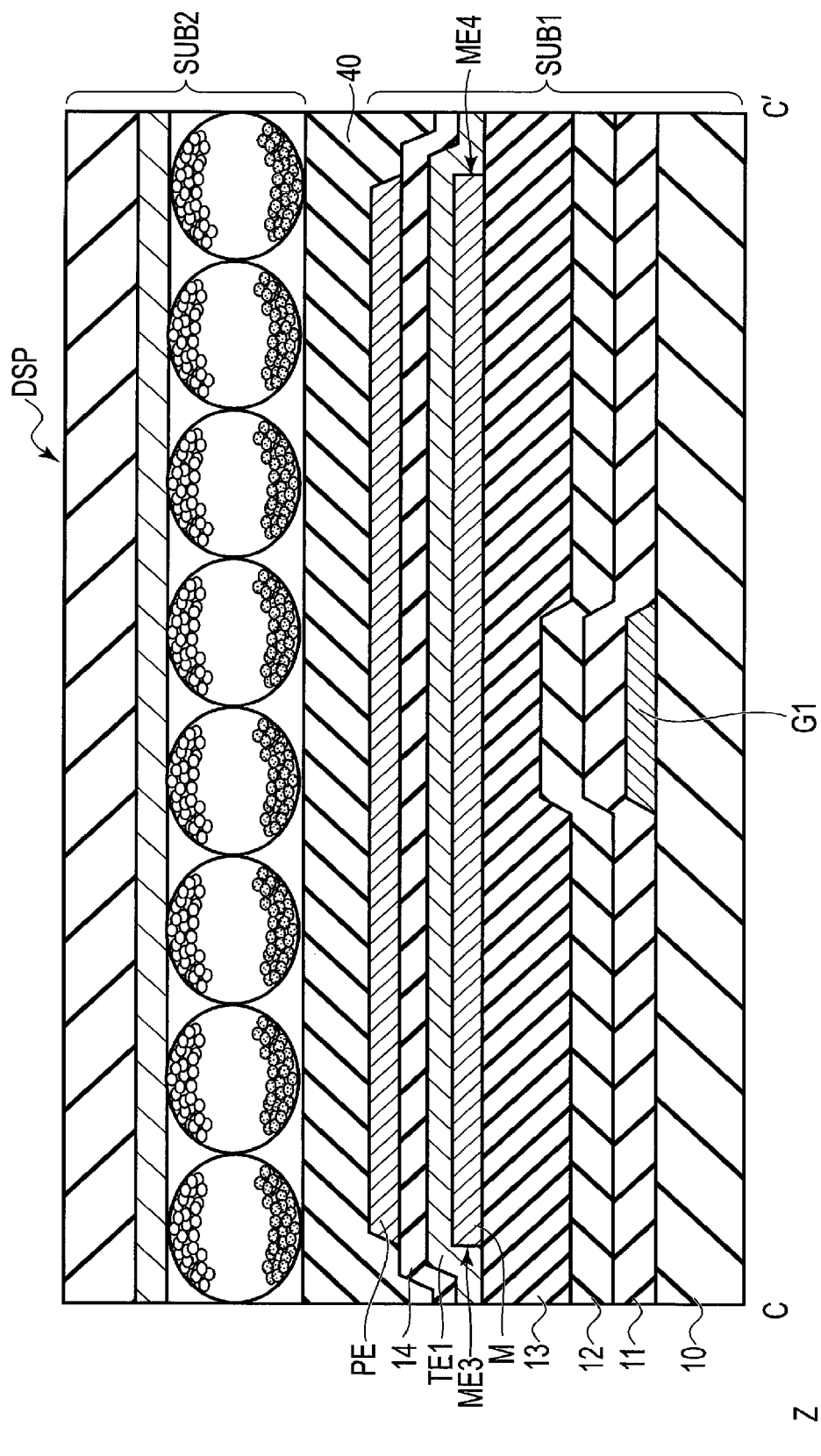
FIG. 5 is a cross-sectional view of the pixel taken along line C-C' which intersects a gate line in FIG. 2.

FIG. 5 is a cross-sectional view of the pixel PX taken along line C-C' which intersects the gate line G1 in FIG. 2.

The side surfaces ME3 and ME4 of the reflective film M are covered by the first transparent conductive film TE1. The reflective film M is disposed in a position overlapping the pixel electrode PE along the third direction Z. In the example illustrated, a width of the reflective film M along the second direction Y and a width of the pixel electrode PE along the second direction Y are equal to each other, but the width of the reflective film M along the second direction Y may be less than the width of the pixel electrode PE along the second direction Y.

According to the first embodiment, the first transparent conductive film TE1 is disposed on the reflective film M so as to cover the side surfaces ME1 to ME5 of the reflective film M. When forming the reflective film M on the insulating film 13, the shapes of the side surfaces ME1 to ME5 may be undesirably deformed by the degradation of the adhesion, for example, due to the material of the reflective film M, which is a metallic film, and that of the insulating film 13, which is an organic insulating film. However, in this embodiment, the first transparent conductive film TE1 covers the side surfaces ME1 to ME5, and thus the coverage of the first capacitance insulating film 14 can be improved. Thus, even if the thickness of the first capacitance insulating film 14 is decreased, the breakage of the first capacitance insulating film 14 can be suppressed, thereby making it possible to inhibit short-circuiting between the pixel electrode PE and the first transparent conductive film TE1. Further, by decreasing the thickness of the first capacitance insulating film 14, the pixel capacitance formed from the pixel electrode PE and the first transparent conductive film TE1 can be increased without changing the area where the pixel electrode PE and the first transparent conductive film TE1 overlap each other. Thus, an even more fine structure can be achieved.

Moreover, for example, in the case where the pixel capacitance is formed from the pixel electrode PE and the reflective film M, if the area of the reflective film M is changed, the pixel capacitance is changed as well, and therefore it is conventionally difficult to design a reflection factor and a pixel capacitance independently. In this embodiment, the pixel capacitance is formed between the pixel electrode PE and the first transparent conductive film TE1. Therefore, even if the area of the reflective film M is changed to adjusts the reflection factor, desired reflection factor and pixel capacitance can be obtained without affecting the pixel capacitance.

Figure 6:
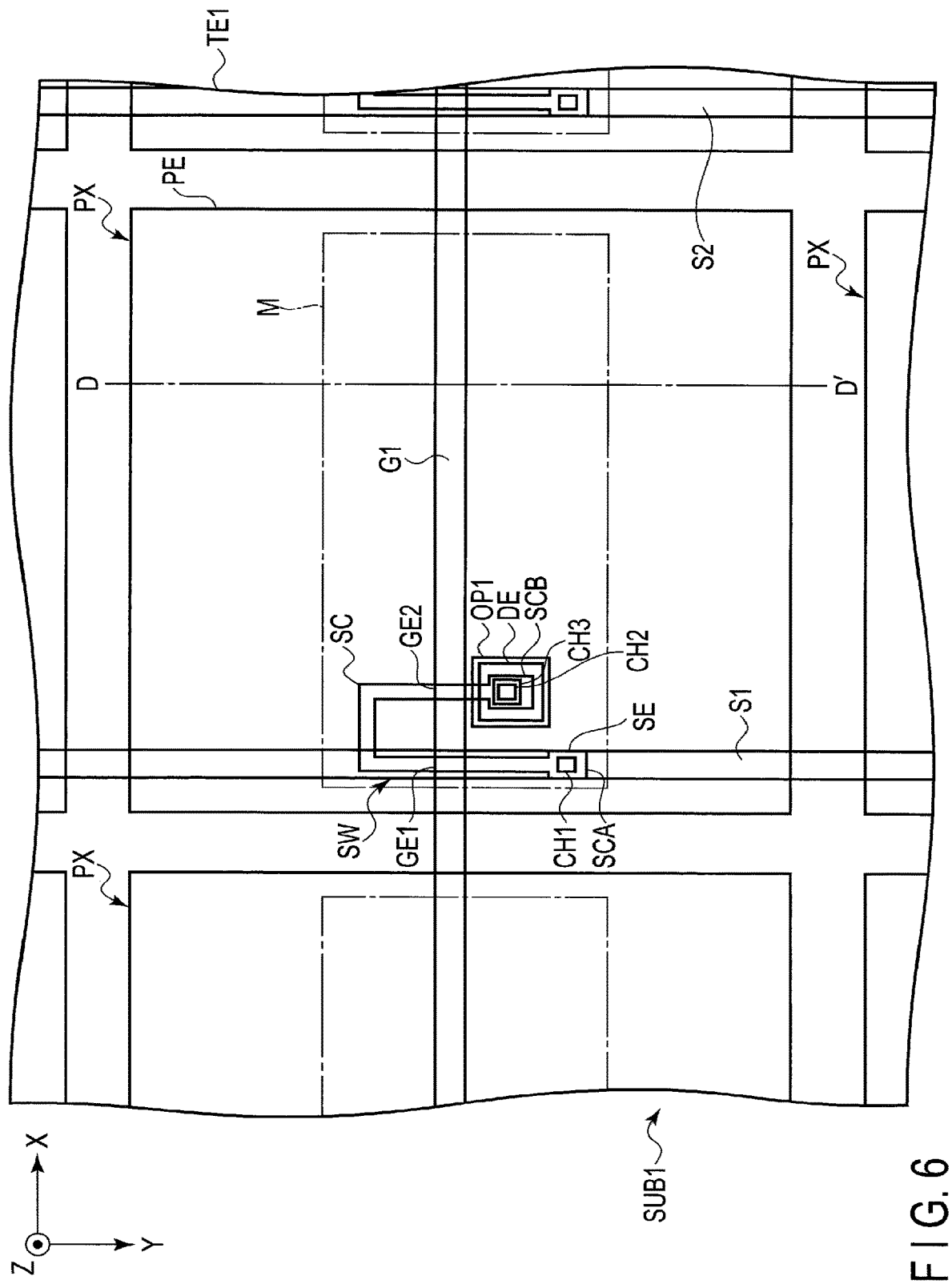
FIG. 6 is a plan view showing a modified example of the pixel of the display device shown in FIG. 1.

FIG. 6 is a plan view showing a modified example of the pixel PX of the display device DSP shown in FIG. 1. The configuration of the example shown in FIG. 6 is different from that shown in FIG. 2 in that the area of the reflective film M is different from the area of the pixel electrode PE in plan view.

More specifically, the width of the reflective film M along the first direction X is less than the width of the pixel electrode PE along the first direction X. Further, the width of the reflective film M along the second direction Y is less than the width of the pixel electrode PE along the second direction Y. The reflective film M overlaps the pixel electrode PE by its entire region in plan view.

Figure 7:
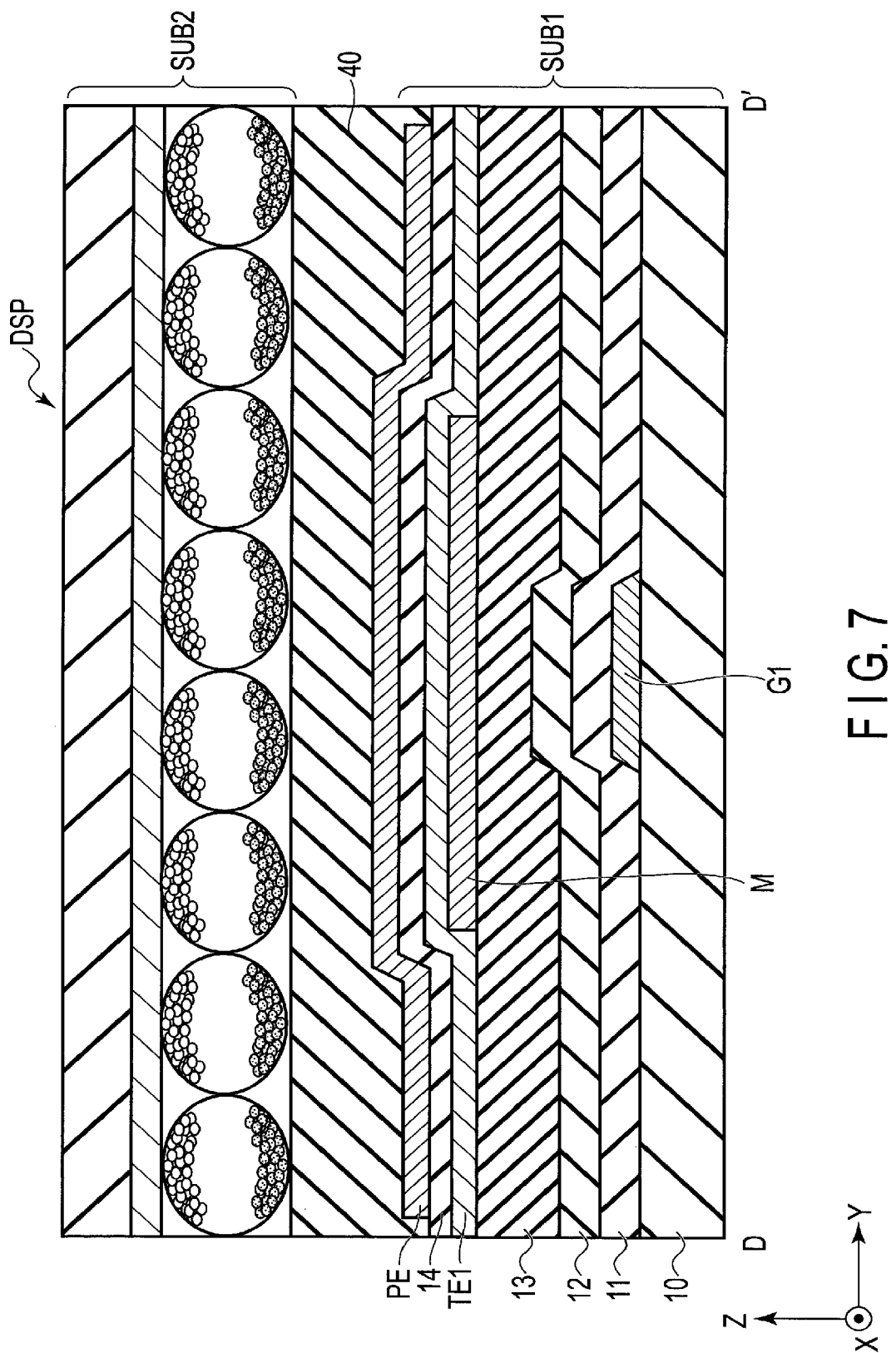
FIG. 7 is a cross-sectional view of the pixel taken along line D-D' which intersects a gate line in FIG. 6.

FIG. 7 is a cross-sectional view of the pixel PX taken along line D-D' which intersects the gate line G1 in FIG. 6.

In the position which overlaps the pixel electrode PE, the first transparent conductive film TE1 is in contact with the insulating film 13. Thus, by changing the area of the reflective film M, the reflection factor can be adjusted.

Moreover, as described above, the pixel capacitance is formed from the first transparent conductive film TE1 and the pixel electrode PE, and therefore, even if the area of the reflective film M is changed, the pixel capacitance is not affected. Therefore, the area of the reflective film M can be freely changed.

In such a modified example as described above, advantageous effects similar to those described above can be obtained.

FIG. 8 is a plan view showing a modified example of the pixel PX of the display device DSP shown in FIG. 1. The configuration shown in FIG. 8 is different from that of FIG. 6 in that the first transparent conductive film TE1 comprises a second opening OP2. The first transparent conductive film TE1 is disposed in a region indicated by diagonal lines.

The second opening OP2 is formed in a position which overlaps the pixel electrode PE. The second opening OP2 does not overlap the source line S1 and the gate line G1, in order to prevent leakage of the electric field to the pixel electrode PE from the source line S1 and the gate line G1. Further, the second opening OP2 does not overlap the reflective film M, in order to prevent the formation of a pixel capacitance by the reflective film M and the pixel electrode PE. The second opening OP2 is formed in a position different from the first opening OP1.

In order to suppress the increase in resistance, which occurs as the first transparent conductive film TE1 becomes thin, second openings OP2 of pixels located adjacent to each other should preferably be spaced as much as possible from each other. For example, in the example illustrated, the second opening OP2 is formed in a left-hand side to the gate line G1, and it is preferable in a pixel PX adjacent thereto to similarly form the second opening OP2 in the left-hand side of the gate line G. This is also the case where the second opening OP2 is formed in a right-hand side of the gate line G1.

Figure 9:
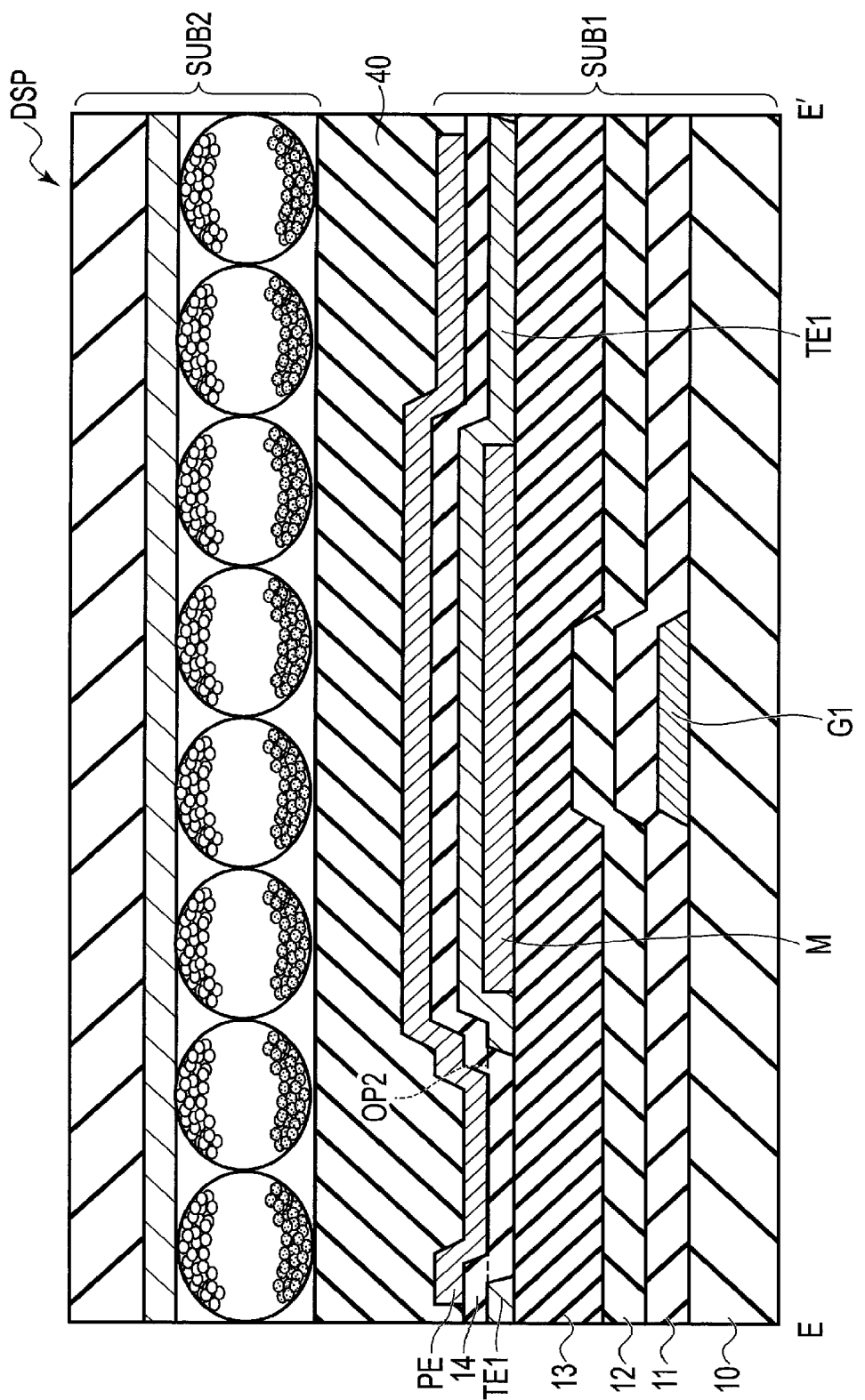
FIG. 9 is a cross-sectional view of the pixel taken along line E-E' which intersects a gate line in FIG. 8.

FIG. 9 is a cross-sectional view of the pixel PX taken along line E-E' which intersects the gate line G1 in FIG. 8.

The capacitance insulating film 14 is in contact with the insulating film 13 in the second opening OP2. In other words, the capacitance insulating film 14 is in contact with the insulating film 13 in a position which overlaps the pixel electrode PE. Thus, with the configuration that the first transparent conductive film TE1 comprises the second opening OP2 in the position overlapping the pixel electrode PE, the pixel capacitance can be adjusted.

In such a modified example as described above, advantageous effects similar to those described above can be obtained.

Figure 10:
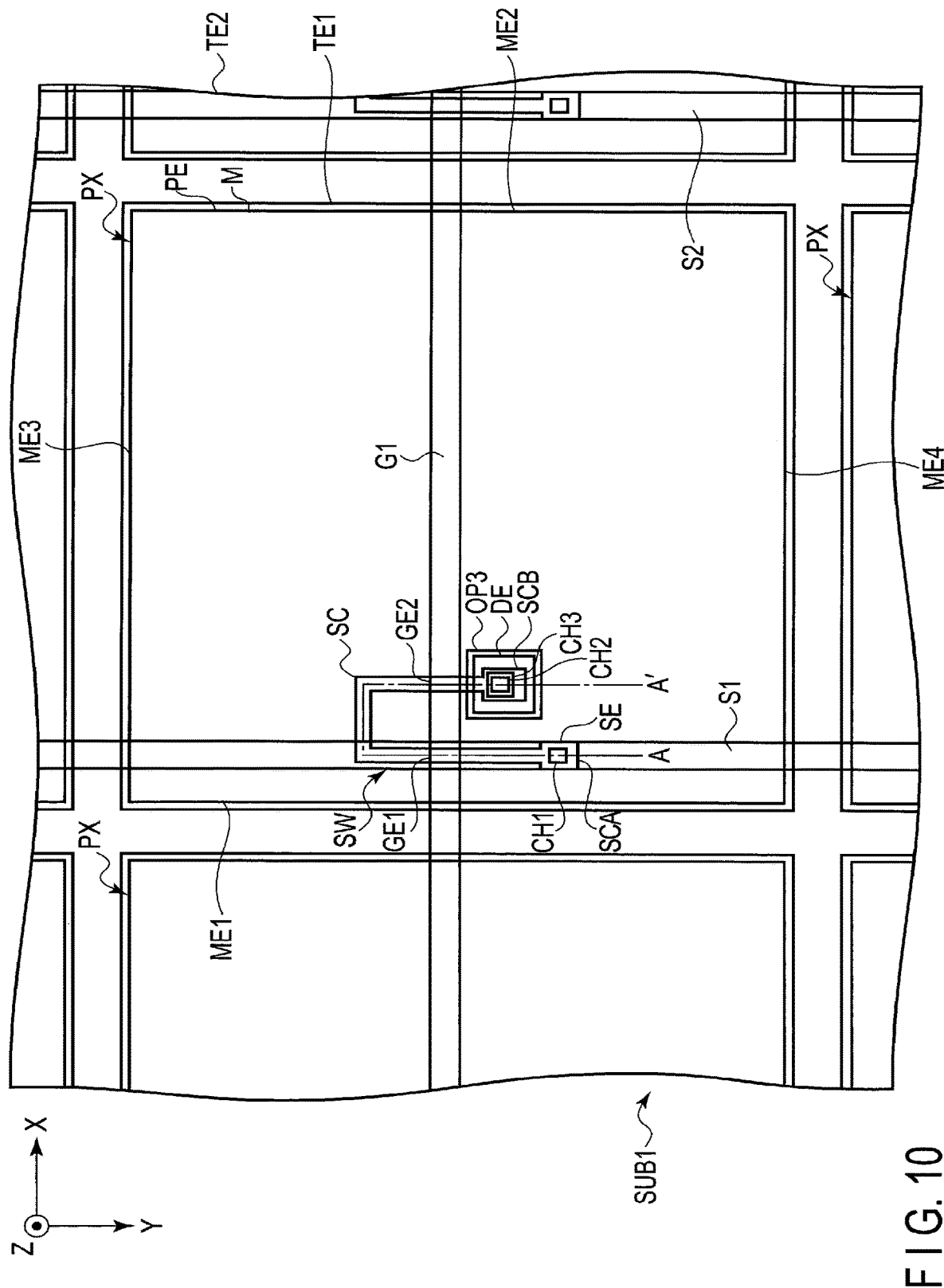
FIG. 10 is a plan view showing a modified example of the pixel of the display device shown in FIG. 1.

FIG. 10 is a plan view showing a modified example of the pixel PX of the display device DSP shown in FIG. 1. The configuration shown in FIG. 10 is different from that of FIG. 2 in that the first substrate SUB1 comprises a second transparent conductive film TE2.

The second transparent conductive film TE2 overlaps a plurality of pixels PX arranged along the first direction X and the second direction Y, and also overlaps both the gate line G1 and the source line S1. The second transparent conductive film TE2 comprises, in each pixel PX, a third opening OP3 in a position which overlaps the drain electrode DE. The second transparent conductive film TE2 is formed over the entire region of the display area DA shown in FIG. 1.

The first transparent conductive film TE1 is formed into an island-like shape in each pixel PX, so as to be greater in size than the pixel electrode PE. A width of the first transparent conductive film TE1 along the first direction X is greater than a width of the reflective film M along the first direction X, and a width of the first transparent conductive film TE1 along the second direction Y is greater than a width of the reflective film M along the second direction Y. The reflective film M overlaps the first transparent conductive film TE1 in the entire region. The side surfaces ME1 to ME4 of the reflective film M are covered by the first transparent conductive film TE1.

Figure 11:
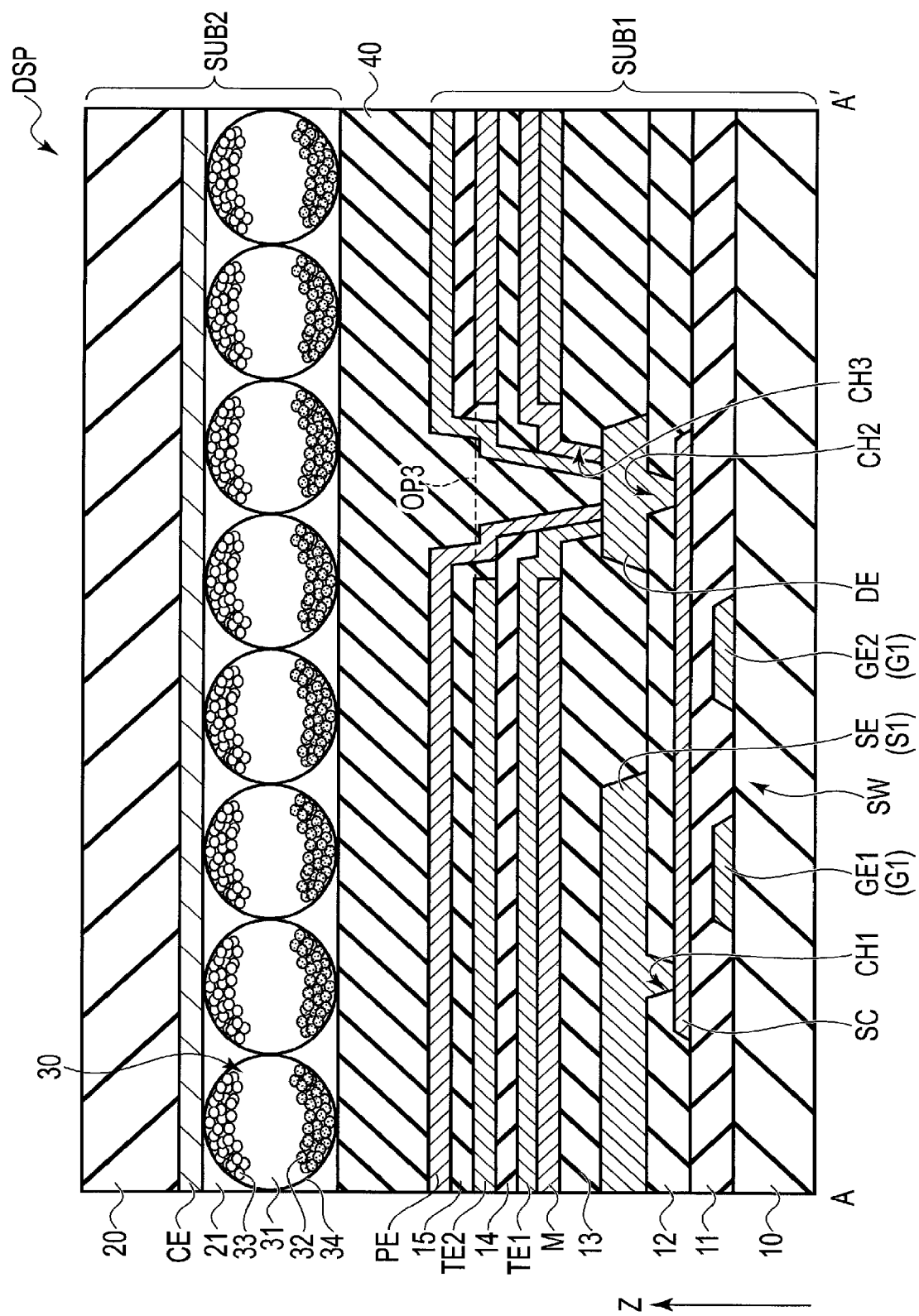
FIG. 11 is a cross-sectional view of the pixel taken along line A-A' in FIG. 10.

FIG. 11 is a cross-sectional view of the pixel PX taken along line A-A' in FIG. 10.

The first substrate SUB1 comprises a second transparent conductive film TE2 disposed on the first capacitance insulating film 14 and a second capacitance insulating film 15 covering the second transparent conductive film TE2. The pixel electrode PE is disposed on the second capacitance insulating film 15.

The first transparent conductive film TE1 is in contact with the pixel electrode PE in the contact hole CH3. Thus, a pixel potential is supplied to the first transparent conductive film TE1. Moreover, to the second transparent conductive film TE2, a common potential is supplied in, for example, the non-display area NDA. The reflective film M is in contact with the first transparent conductive film TE1, and thus, for example, a pixel potential is supplied. Note that the reflective film M and the first transparent conductive film TE1, shown in FIG. 3, are at a common potential, and therefore this example is different from that of FIG. 11.

That is, in the example illustrated, a pixel capacitance is formed between the first transparent conductive film TE1 and the second transparent conductive film TE2, and between the second transparent conductive film TE2 and the pixel electrode PE. With the configuration that the second transparent conductive film TE2 arranged between the first transparent conductive film TE1 and the pixel electrode PE, the pixel capacitance can be increased. Thus, the pixel capacitance can be increased without increasing the areas of the pixel electrode PE and the first transparent conductive film TE1 along the first direction X and the second direction Y. Thus, an even more fine structure can be achieved.

In such a modified example as described above, advantageous effects similar to those described above can be obtained.

Next, a second embodiment will be described.

Figure 12:
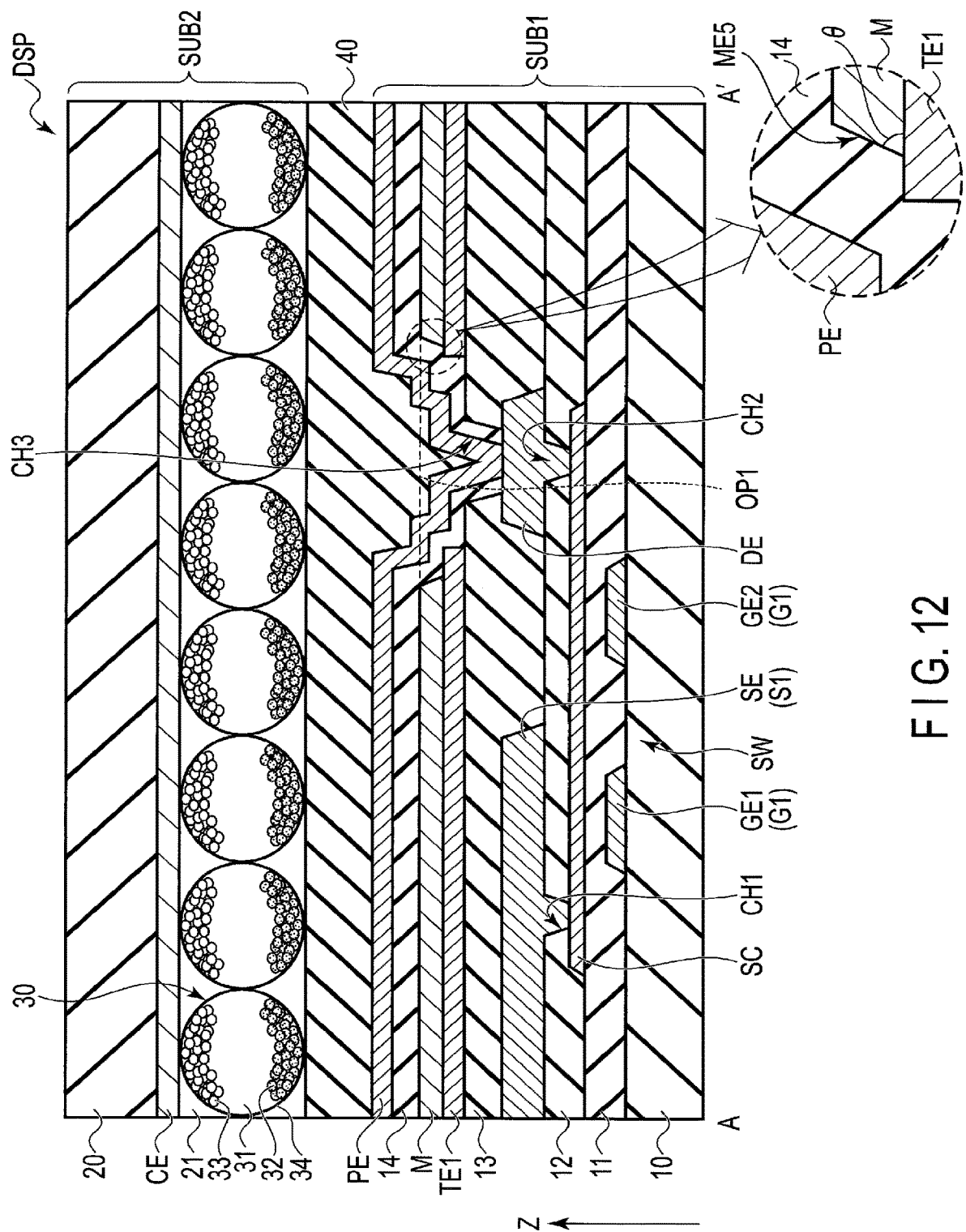
FIG. 12 is a cross-sectional view of the pixel taken along line A-A' in FIG. 2.

FIG. 12 is a cross-sectional view of the pixel PX taken along line A-A' in FIG. 2. The configuration shown in FIG. 12 is different from that of FIG. 3 in that the reflective film M is located on the first transparent conductive film TE1.

The first transparent conductive film TE1 is disposed on the insulating film 13 so as to be in contact therewith. The reflective film M is disposed on the first transparent conductive film TE1. The reflective film M and the first transparent conductive film TE1 are covered by the capacitance insulating film 14. The reflective film M comprises a forward tapered side surface ME5 in the first opening OP1. As partially expanded in FIG. 12, an angle θ made by the side surface ME5 opposing the first opening OP1 of the reflective film M and the first transparent conductive film TE1 is an acute angle.

Figure 13:
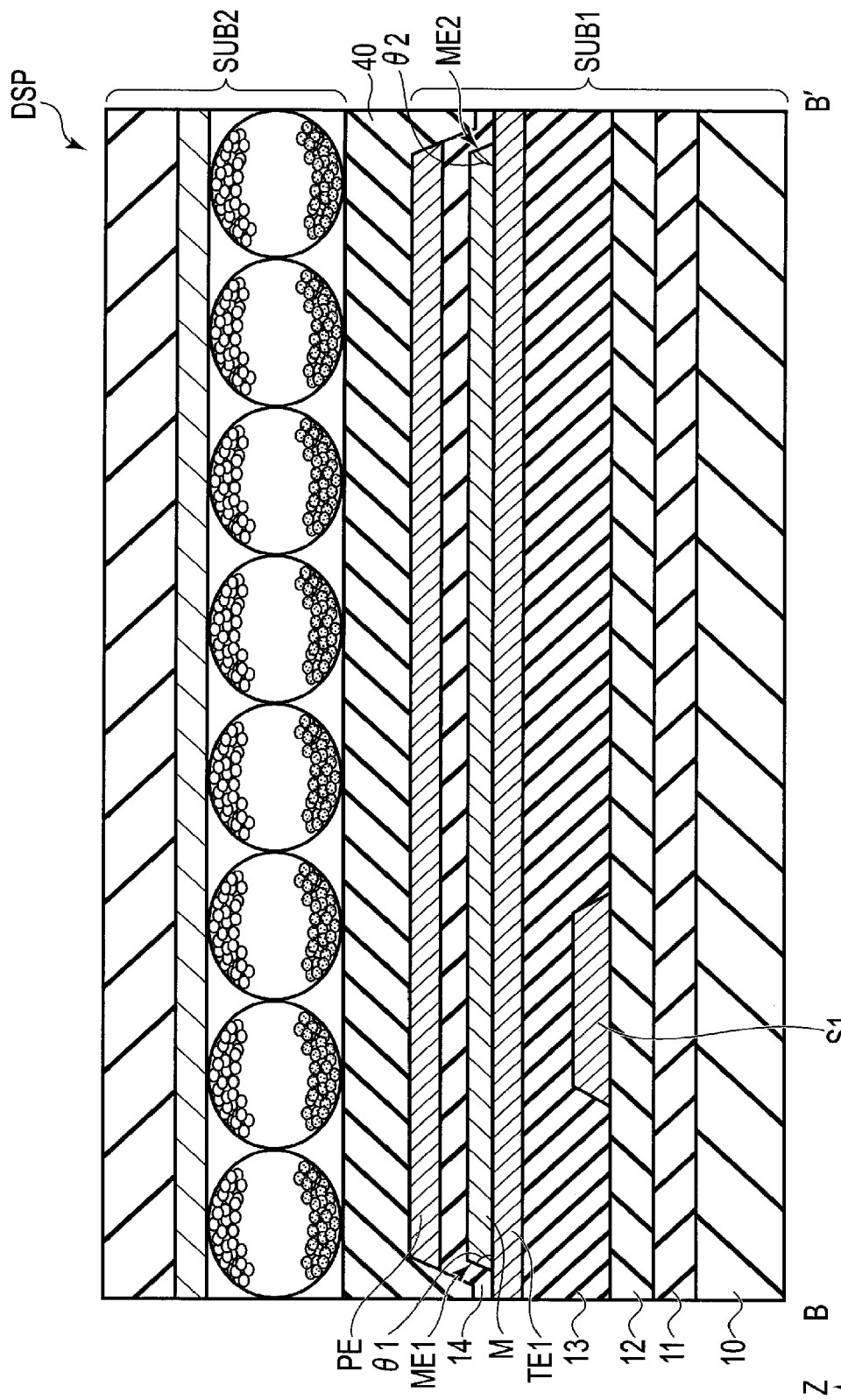
FIG. 13 is a cross-sectional view of the pixel taken along line B-B' which intersects a source line in FIG. 2.

FIG. 13 is a cross-sectional view of the pixel PX taken along line B-B' which intersects the source line S1 in FIG. 2.

The side surfaces ME1 and ME2 of the reflective film M are in contact with the first transparent conductive film TE1, and are covered by the first capacitance insulating film 14. The side surfaces ME1 and ME2 are formed into a forward tapered shape as in the case of the side surface ME5 described above. That is, both an angle θ1 made by the side surface ME1 and the first transparent conductive film TE1 and an angle θ2 made by the side surface ME2 and the first transparent conductive film TE1 are acute angles.

Figure 14:
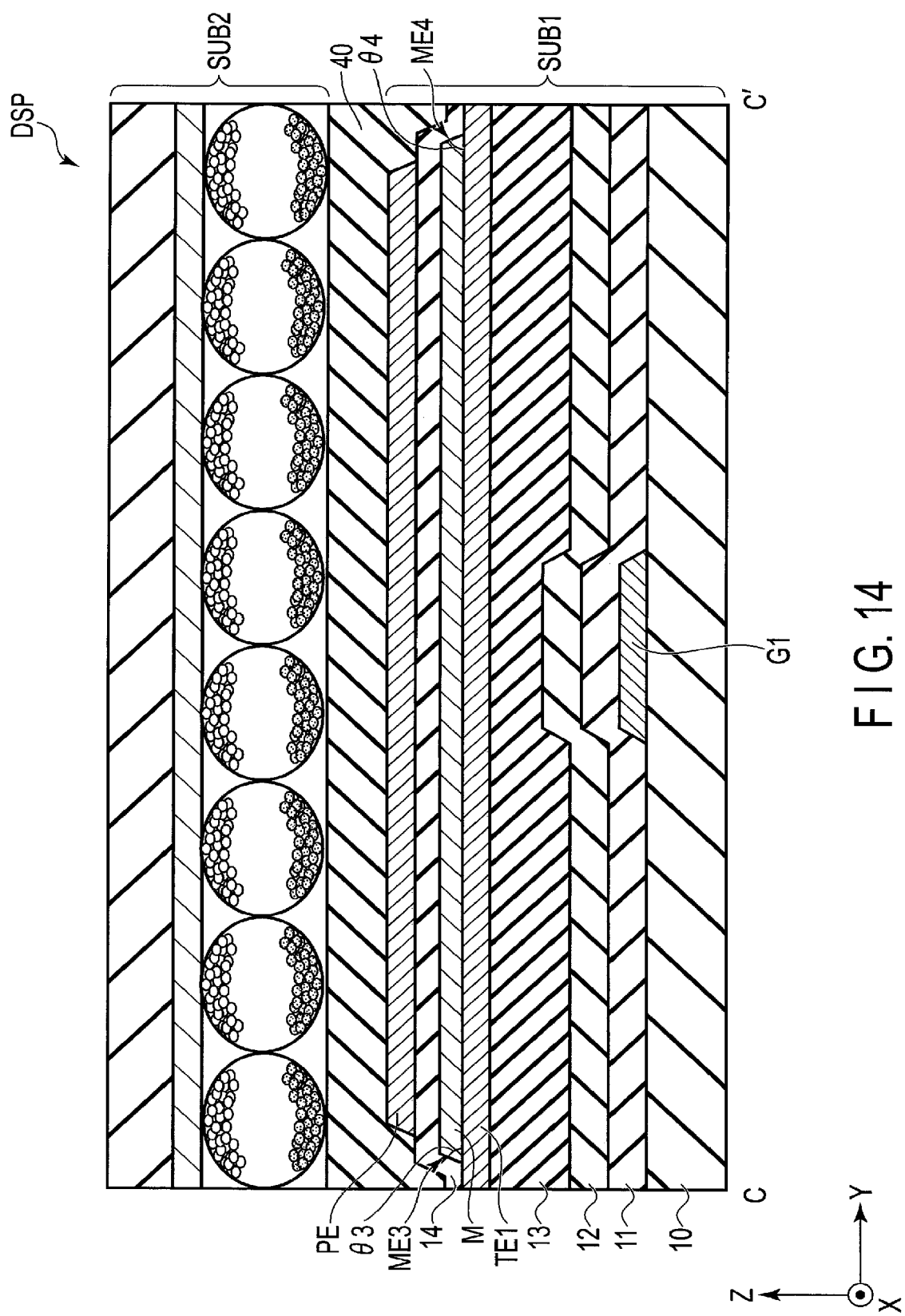
FIG. 14 is a cross-sectional view of the pixel taken along line C-C' which intersects a gate line in FIG. 2.

FIG. 14 is a cross-sectional view of the pixel PX taken along line C-C' which intersects the gate line G1 in FIG. 2.

The side surfaces ME3 and ME4 of the reflective film M are in contact with the first transparent conductive film TE1, and are covered by the first capacitance insulating film 14. The side surfaces ME3 and ME4 are formed into a forward tapered shape as in the case of the side surface ME5 described above. That is, both an angle θ3 made by the side surface ME3 and the first transparent conductive film TE1 and an angle θ4 made by the side surface ME4 and the first transparent conductive film TE1 are acute angles.

According to the second embodiment, the first transparent conductive film TE1 is disposed between the reflective film M and the insulating film 13. The adhesion between the first transparent conductive film TE1 formed of ITO and the reflective film M formed of a metallic material is higher than the adhesion between the insulating film 13 formed of an organic insulating material and the reflective film M. Therefore, with the structure of the second embodiment, deformation of the shapes of the side surfaces ME1 to ME5, which may occur when forming the reflective film M, can be suppressed as compared to the case where the reflective film M is formed on the insulating film 13. By forming the reflective film M on the first transparent conductive film TE1, the side surfaces ME1 to ME5 having, for example, such a forward tapered shape as described above can be formed. When the side surfaces ME1 to ME5 are formed into a forward tapered shape, the coverage of the first capacitance insulating film 14 can be improved. Thus, even if the thickness of the first capacitance insulating film 14 is reduced, the breakage of the first capacitance insulating film 14 can be inhibited, thereby preventing short-circuiting between the pixel electrode PE and the reflective film M. Further, by reducing the thickness of the first capacitance insulating film 14, the pixel capacitance formed by the pixel electrode PE and the first transparent conductive film TE1 can be increased without changing the area where the pixel electrode PE and the first transparent conductive film TE1 overlap each other. Thus, an even more fine structure can be achieved.

Furthermore, the first transparent conductive film TE1 has low moisture permeability as compared to that of the insulating film 13. Therefore, the corrosion of the reflective film M can be suppressed as compared with the case where the reflective film M is in contact with the insulating film 13.

Figure 15:
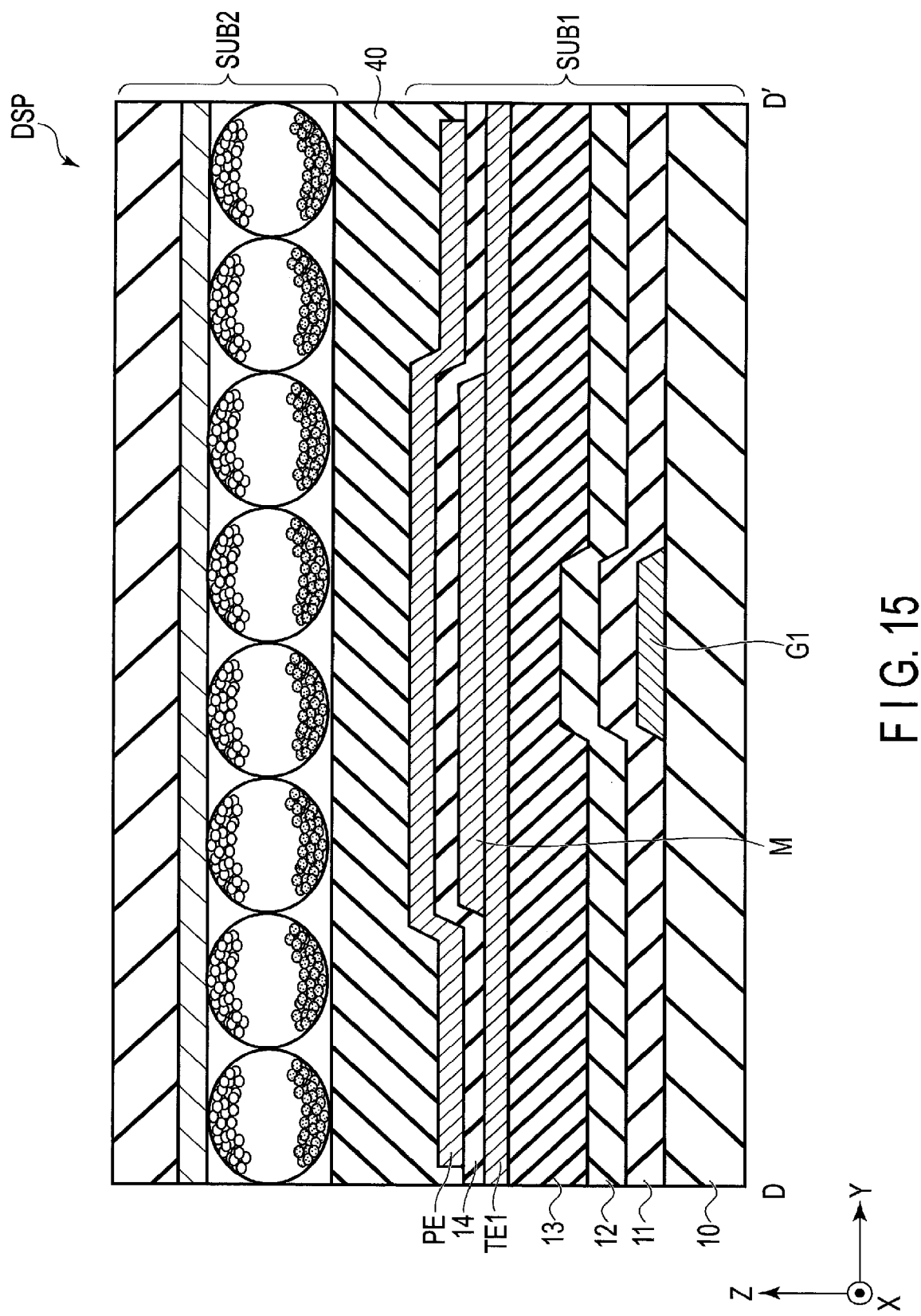
FIG. 15 is a cross-sectional view of the pixel taken along line D-D' which intersects a gate line in FIG. 6.

FIG. 15 is a cross-sectional view of the pixel PX taken along line D-D' which intersects the gate line G1 in FIG. 6. In the second embodiment as well, as shown in FIG. 6, the area of the reflective film M can be made smaller than the area of the pixel electrode PE.

The capacitance insulating film 14 is in contact with first transparent conductive film TE1 in a position which overlaps the pixel electrode PE. Thus, in the second embodiment as well, the reflectivity can be adjusted by changing the area of the reflective film M.

In such a modified example as described above, advantageous effects similar to those described above can be obtained.

FIG. 16 is a cross-sectional view of a modified example of the pixel PX taken along line A-A' in FIG. 2. The configuration shown in FIG. 16 is different from that of FIG. 12 in that the first substrate SUB1 has an island portion IS disposed in the contact hole CH3.

The island portion IS is in contact with the drain electrode DE, the first capacitance insulating film 14 and the pixel electrode PE. The island portion IS electrically connects the drain electrode DE and the pixel electrode PE to each other. The island portion IS is formed from a material identical to that of the first transparent conductive film TE1, that is, for example, ITO or IZO. The island portion IS is spaced apart from the first transparent conductive film TE1, so that they are electrically insulated from each other. The reflective film M is formed in the following manner. That is, the first transparent conductive film TE1 is patterned, and then a metallic film is formed on the first transparent conductive film TE1. The metallic film is patterned, thus forming the reflective film M. As illustrated, with the island portion IS disposed in the contact hole CH3, a damage which may be caused to the drain electrode DE by etching while forming the reflective film M, can be inhibited.

Figure 17:
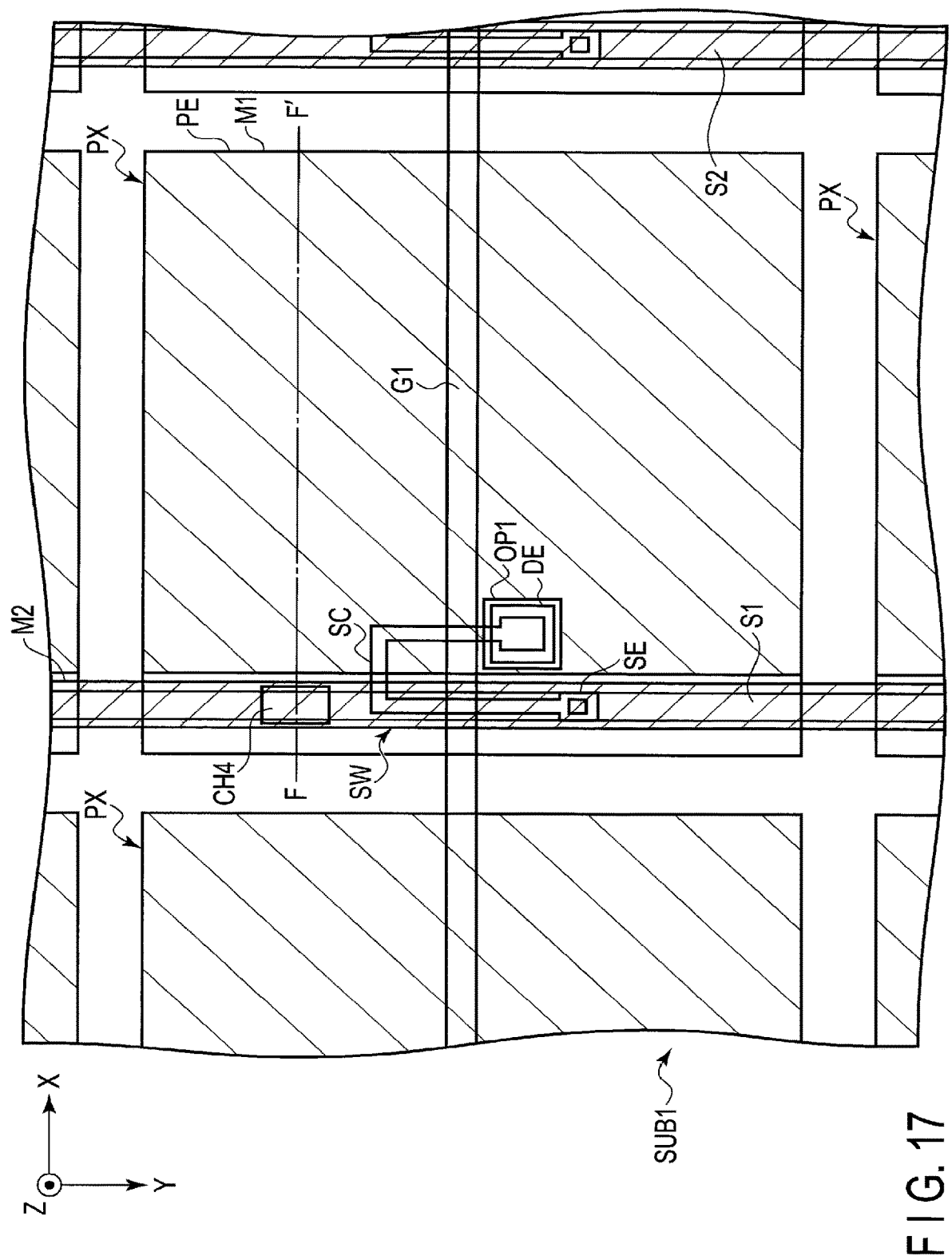
FIG. 17 is a plan view showing a modified example of the display device shown in FIG. 1.

FIG. 17 is a plan view showing a modified example of the display device PX shown in FIG. 1. The configuration shown in FIG. 17 is different from that of FIG. 2 in that the reflective film M includes a first reflective film M1 and a second reflective film M2.

The first reflective film M1 overlaps the pixel electrode PE. The second reflective film M2 overlaps the pixel electrode PE and the source line S1. The second reflective film M2 is electrically connected to the source line S1 via the contact hole CH4, and extends along the source line S1 in the second direction Y. The first reflective film M1 and the second reflective film M2 are spaced apart from each other and disposed in different positions in plan view. Here, by electrically connecting the source line S with the second reflective film M2 formed of a metal material, the resistance of the source line S can be lowered. Note that a plurality of contact holes CH4 may be formed so that each electrically connects each respective pair of a second reflective film M2 and a source line S to each other.

FIG. 18 is a plan view showing the position of the first transparent conductive film TE1 in the pixel PX shown in FIG. 17. The configuration shown in FIG. 18 is different from that of FIG. 2 in that the first transparent conductive film TE1 includes a third transparent conductive film TE3 and a fourth transparent conductive film TE4.

The third transparent conductive film TE3 overlaps the pixel electrode PE. The fourth transparent conductive film TE4 overlaps the pixel electrode PE and the source line S1, and extends along the source line S1 in the second direction Y. The third transparent conductive film TE3 and the fourth transparent conductive film TE4 are spaced apart from each other, and are disposed in different positions in plan view.

FIG. 19 is a cross-sectional view of the pixel PX taken along line F-F' which intersects the source line S1 in FIG. 18.

The first reflective film M1 is in contact with the third transparent conductive film TE3. The second reflective film M2 is in contact with the fourth transparent conductive film TE4. A slit SL is formed between the third transparent conductive film TE3 and the fourth transparent conductive film TE4. The first capacitance insulating film 14 is in contact with the insulating film 13 in the slit SL. The second reflective film M2 is electrically connected to the source line S1 via the contact hole CH4 which penetrates the fourth transparent conductive film TE4 and the insulating film 13. The pixel electrode PE overlaps the third transparent conductive film TE3, the fourth transparent conductive film TE4, the first reflective film M1, the second reflective film M2 and slit SL.

To the third transparent conductive film TE3, a common potential is supplied in, for example, the non-display area NDA. The first reflective film M1 is in contact with the third transparent conductive film TE3, and therefore a common potential is supplied thereto. The second reflective films M2 is connected with the source line S1, and therefore it is at the same potential as the source line S1. The fourth transparent conductive film TE4 is in contact with the second reflective film M2, and therefore it is at the same potential as the source line S1.

FIG. 20 is a plan view showing positions of third transparent conductive films TE3 and fourth transparent conductive films TE4 shown in FIG. 19, with relative to each other.

The third transparent conductive films TE3 and the fourth transparent conductive films TE4 are arranged alternately along the first direction X. The third transparent conductive films TE3 and the fourth transparent conductive film TE4 extend along the second direction Y in the display area DA. The fourth transparent conductive film TE4 overlaps the source lines S extending along the second direction Y.

The non-display area NDA includes a first area NDA1 and a second region NDA2 extending along the second direction Y, and a third region NDA3 and fourth region NDA4 extending along the first direction X. The third transparent conductive films TE3 are connected to a driver 2 by wiring lines WR, respectively. Those of the wiring lines WR which are connected to odd-numbered third transparent conductive films TE3 from the left are connected to the third transparent conductive films TE3 in the third area NDA3. The wiring lines WR connected to the third transparent conductive films TE3 in the third area NDA3 are connected to the driver 2 through the first area NDA1 and the second area NDA2. Those of the wiring lines WR which are connected to even-numbered third transparent conductive films TE3 from the left are connected to the third transparent conductive film TE3 in the fourth area NDA4. According to such a layout, the wiring lines WR can be dispersedly arranged, and therefore it is appropriate for the reduction of the width of the frame.

As described above, according to the embodiments, a display device with a very fine structure can be obtained.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A display device comprising:
    a switching element;
    an organic insulating film which covers the switching element;
    a reflective film in contact with the organic insulating film;
    a first transparent conductive film which covers the reflective film;
    a first capacitance insulating film which covers the first transparent conductive film;
    a pixel electrode disposed on the first capacitance insulating film and electrically connected to the switching element;

an electrophoretic element disposed on the pixel electrode;
a common electrode disposed on the electrophoretic element,
a second transparent conductive film disposed on the first capacitance insulating film; and
a second capacitance insulating film which covers the second transparent conductive film,
wherein
the pixel electrode is disposed on the second capacitance insulating film.

2. The display device of claim 1, wherein
the first transparent conductive film covers a side surface of the reflective film.

3. The display device of claim 1, wherein
an area of the reflective film is different from an area of the pixel electrode in plan view.

4. The display device of claim 1, wherein
the first transparent conductive film comprises a first opening communicated to the switching element and a second opening different from the first opening.

5. The display device of claim 4, further comprising:
a source line and a gate line electrically connected to the switching element,
wherein
the second opening does not overlap the source line and the gate line.

6. The display device of claim 4, wherein
the second opening does not overlap the reflective film.

7. A display device comprising:
a switching element;
an organic insulating film which covers the switching element;
a first transparent conductive film in contact with the organic insulating film;
a reflective film disposed on the first transparent conductive film;
a first capacitance insulating film which covers the reflective film and the first transparent conductive film;
a pixel electrode disposed on the first capacitance insulating film and electrically connected to the switching element;
an electrophoretic element disposed on the pixel electrode; and
a common electrode disposed on the electrophoretic element, wherein
the pixel electrode is electrically connected to the switching element via a contact hole which penetrates the organic insulating film, and
the display device comprises an island portion disposed in the contact hole and formed of a material identical to that of the first transparent conductive film, and
the first transparent conductive film and the island portion are electrically insulated from each other.

8. The display device of claim 7, wherein
the side surface of the reflective film is forwardly tapered.

9. The display device of claim 7, wherein
an area of the reflective film is different from an area of the pixel electrode in plan view.

10. The display device of claim 7, further comprising:
a source line electrically connected to the switching element,
wherein
the reflective film comprises a first reflective film which overlaps the pixel electrode, and a second reflective film electrically connected to the source line and disposed along the source line.

11. The display device of claim 10, wherein
the first transparent conductive film comprises a third transparent conductive film which overlaps the pixel electrode, and a fourth transparent conductive film which overlaps the source line.

12. A display device comprising:
a switching element;
an organic insulating film which covers the switching element;
a first transparent conductive film in contact with the organic insulating film;
a reflective film disposed on the first transparent conductive film;
a first capacitance insulating film which covers the reflective film and the first transparent conductive film;
a pixel electrode disposed on the first capacitance insulating film and electrically connected to the switching element;
an electrophoretic element disposed on the pixel electrode;
a common electrode disposed on the electrophoretic element; and
a source line electrically connected to the switching element,
wherein
the reflective film comprises a first reflective film which overlaps the pixel electrode, and a second reflective film electrically connected to the source line and disposed along the source line.

13. The display device of claim 12, wherein
the side surface of the reflective film is forwardly tapered.

14. The display device of claim 12, wherein
an area of the reflective film is different from an area of the pixel electrode in plan view.

15. The display device of claim 12, wherein
the first transparent conductive film comprises a third transparent conductive film which overlaps the pixel electrode, and a fourth transparent conductive film which overlaps the source line.

* * * * *